US011662543B2

United States Patent
Liu et al.

(10) Patent No.: US 11,662,543 B2
(45) Date of Patent: May 30, 2023

(54) MULTI-GROUP LENS, CAMERA MODULE, AND ELECTRONIC DEVICE THEREOF

(71) Applicant: NINGBO SUNNY OPOTECH CO., LTD., Zhejiang (CN)

(72) Inventors: Chunmei Liu, Zhejiang (CN); Mingzhu Wang, Zhejiang (CN); Hailong Liao, Zhejiang (CN); Liang Ding, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 17/987,381

(22) Filed: Nov. 15, 2022

(65) Prior Publication Data

US 2023/0102189 A1   Mar. 30, 2023

Related U.S. Application Data

(62) Division of application No. 16/620,935, filed as application No. PCT/CN2018/091441 on Jun. 15, 2018, now Pat. No. 11,531,180.

(30) Foreign Application Priority Data

Jun. 16, 2017 (CN) .......................... 201710457937.5
Jun. 16, 2017 (CN) .......................... 201720707119.1

(51) Int. Cl.
*G02B 7/02* (2021.01)
*G03B 17/12* (2021.01)
(Continued)

(52) U.S. Cl.
CPC ............. *G02B 7/021* (2013.01); *G02B 7/025* (2013.01); *G03B 17/12* (2013.01); *H04N 23/55* (2023.01); *H04N 23/57* (2023.01)

(58) Field of Classification Search
CPC ........ H04N 23/55; H04N 23/57; G03B 17/12; G02B 7/003; G02B 7/02; G02B 7/021; G02B 7/023; G02B 7/025
See application file for complete search history.

(56) References Cited

U.S. PATENT DOCUMENTS 10,187,560 B2 *  1/2019  Chen ....................... H04N 23/57
2001/0040737 A1  11/2001  Nakano
(Continued)

FOREIGN PATENT DOCUMENTS

CN     102023361     4/2011
CN     105445885     3/2016
(Continued)

OTHER PUBLICATIONS

International Search Report dated Sep. 18, 2018 in International (PCT) Application No. PCT/CN2018/091441.

*Primary Examiner* — Chiawei Chen
(74) *Attorney, Agent, or Firm* — Wenderoth, Lind & Ponack, L.L.P.

(57) ABSTRACT

A multi-group lens assembly (10), a camera module (100), and an electronic device (200) therefore are provided. The multi-group lens assembly (10) includes at least two group units (11 and 12). At least a first gap (15) is provided between the at least two adjacent group units (11 and 12) to compensate a difference between the multi-group lens assembly (10) and an optical design system, thus allowing an optical system of the multi-group lens assembly conform to the optical design system of the present invention.

20 Claims, 15 Drawing Sheets

(51) Int. Cl.
*H04N 23/55* (2023.01)
*H04N 23/57* (2023.01)

(56) References Cited

U.S. PATENT DOCUMENTS

| | | | | |
|---|---|---|---|---|
| 2004/0262704 | A1* | 12/2004 | Vittu | H01L 31/02325 |
| | | | | 257/E31.127 |
| 2006/0087751 | A1 | 4/2006 | Liu et al. | |
| 2008/0151396 | A1* | 6/2008 | Chiang | G02B 7/021 |
| | | | | 359/823 |
| 2009/0251800 | A1 | 10/2009 | Iwai | |
| 2011/0037887 | A1* | 2/2011 | Lee | G02B 13/0035 |
| | | | | 348/340 |
| 2011/0058265 | A1* | 3/2011 | Chang | G02B 13/004 |
| | | | | 359/793 |
| 2012/0147489 | A1* | 6/2012 | Matsuoka | G02B 7/025 |
| | | | | 359/819 |
| 2014/0184521 | A1* | 7/2014 | Kwong | G03B 17/12 |
| | | | | 345/173 |
| 2017/0123179 | A1 | 5/2017 | Wang et al. | |
| 2018/0059512 | A1* | 3/2018 | Rho | G03B 17/14 |
| 2018/0095236 | A1* | 4/2018 | Takama | G02B 7/021 |
| 2018/0106978 | A1 | 4/2018 | Wang et al. | |
| 2018/0364545 | A1 | 12/2018 | Wang et al. | |

FOREIGN PATENT DOCUMENTS

| | | |
|---|---|---|
| CN | 105445889 | 3/2016 |
| CN | 105487190 | 4/2016 |
| CN | 107238909 | 10/2017 |
| CN | 208351093 | 1/2019 |
| EP | 2 933 670 | 10/2015 |
| KR | 10-2007-0009151 | 1/2007 |
| KR | 10-2014-0076761 | 6/2014 |
| KR | 10-2015-0120735 | 10/2015 |
| WO | 2011/076634 | 6/2011 |

* cited by examiner

MULTI-GROUP LENS, CAMERA MODULE, AND ELECTRONIC DEVICE THEREOF

FIELD OF THE INVENTION

The present invention relates to the field of optical lens and camera module, and further relates to a multi-group lens assembly and a camera module, and an electronic device therefor, and more particularly to a multi-lens lens assembly suitable for a high-pixel camera module.

BACKGROUND OF THE INVENTION

A lens assembly is an indispensable and extremely important part of a camera module. Performance of the lens assembly itself directly affects imaging quality of the camera module.

With continuous development of various smart devices, such as a smart phone, a wearable device or the like, requirements for the camera module and the performance of the camera module itself are constantly increasing.

In the development of the camera module, one of the most outstanding performances is that the imaging quality requirements of the camera module are getting higher and higher, for example, the pixel is required to be higher and higher. The imaging quality of the camera module is related to many components, such as the performance of the photosensitive element, the number of lenses of the lens assembly, the process precision that can be achieved during manufacturing, and the design performance of the optical lens, etc. Therefore, the development of the camera module needs to cooperate with development in many aspects. Correspondingly, the development of different components also depends on the development needs of other components. For example, in the early days, when overall performance of the camera module was poor, the pixels of the photosensitive element were lower, and the lens assembly only required two or three pieces of lenses, and in recent years, the factors such as the photosensitive element and the manufacturing process of the camera module or the like are changing with each passing day, and the requirements for the lens assembly are also leaps and bounds. The multi-lens lens assembly has become an unstoppable development direction.

A closer look at structure of a traditional lens assembly reveals that the lens assembly usually includes a lens barrel and a lens. The designed and manufactured lenses are sequentially mounted in the lens barrel, thereby forming a lens assembly with a complete optical system, which can be assembled to form a camera module to achieve complete image collection and reproduction.

It should be noted here that the optical system is a very sensitive system. In the process of manufacturing, the lens assembly is first theoretical optically designed, then the lenses are manufactured, and then the lenses are sequentially assembled in the lens barrel to form the lens assembly. It can be seen that, between the theoretical optical design and the actual application product, errors are inevitable, especially in the process of lens assembly, there is a certain error for each lens, and after a plurality of lenses are assembled, a whole cumulative error is formed. It is easy to understand that this cumulative error will increase with the increase in the number of the lenses, which is an obvious and difficult problem to solve when the traditional integrated structure lens assembly is exposed to the needs of multi-lens lens assembly.

In the traditional integrated lens assembly, the lenses are sequentially fixed in the lens barrel. That is to say, once the lenses are mounted in the lens barrel, the position can hardly be adjusted. On one hand, the mounting process precision is extremely high. On the other hand, the yield of the product is low.

Secondly, in modern camera modules and related fields, the demand for camera modules and related components is huge, so the yield in mass production is an important factor in determining whether an ideal design can be practically applied. In the assembly process of the camera module, AA calibration (Active Alignment), that is, to make the optical axes of each component consistent by adjusting in different directions, is an important step in adjusting the optical system. To a certain extent, the AA calibration process affects the yield of the camera module. The traditional lens assembly is mounted on the lens assembly holder or mounted on the motor. During the AA calibration process, the lens assembly can only follow the lens assembly holder or motor movement, and can't make any adjustments by itself. That is to say, the lens assembly has no effect on AA calibration. In fact, the optical system is mainly composed of a lens assembly and a photosensitive element, and in a camera module composed of a traditional lens assembly, the lens assembly is not directly adjustable.

Thirdly, in the design and manufacturing process of the lens assembly, from the ideal optical system to the product made of the actual lenses and the lens barrel, the actual implementation process needs to be considered during the manufacture of the lens assembly, for example, when the actual lens barrel and lenses are manufactured, what standards need to be met in the initial stage, and how to adjust in the latter stage, these are the issues that must be considered to make the lens assembly from theoretical design to actual products, and even more so for multi-lens optical lens assembly in this way.

It can be seen from the above that the traditional integrated lens assembly cannot meet the needs of multiple lenses. The development of the lens assembly needs to cross this traditional structural limitation. Further, in the design and production process, it is necessary to explore the design and structure that suits it, so that the theoretical optical design can be put into actual mass production, and has good product yield.

SUMMARY OF THE INVENTION

An object of the present invention is to provide a multi-group lens assembly and a camera module, and an electronic device therefor, wherein the multi-group lens assembly forms an integral lens assembly by at least two group units, thereby breaking through the traditional integrated lens assembly structure, and is suitable for a multi-lens lens assembly.

An object of the present invention is to provide a multi-group lens assembly and a camera module, and an electronic device therefor, wherein cumulative error of the integral lens assembly is shared by a plurality of group units, and by adjusting spatial range of the plurality of group units during assembling process, the cumulative error of the multi-group lens assembly is reduced.

An object of the present invention is to provide a multi-group lens assembly and a camera module, and an electronic device therefor, wherein the multi-group lens assembly is particularly suitable for forming a lens assembly of 6, 7 or more pieces of lenses, which is suitable for multi-lens development needs of conventional lens assembly.

An object of the present invention is to provide a multi-group lens assembly and a camera module, and an electronic device therefor, wherein the multi-group lens assembly is composed of at least two group units, wherein there is a first gap between at least two adjacent group units, so that optical system of actual product meets optical design requirements.

An object of the present invention is to provide a multi-group lens assembly and a camera module, and an electronic device therefor, wherein the first gap enables the multi-group lens assembly to be AA-calibrated during actual production, and after AA calibration, an expected result is well maintained in subsequent assembling.

An object of the present invention is to provide a multi-group lens assembly and a camera module, and an electronic device therefor, wherein the first gap cooperates with a pre-design difference between an actual value and a theoretical value of the multi-group unit in actual production, so that optical systems of the actual group unit and the theoretical group unit with difference are consistent.

An object of the present invention is to provide a multi-group lens assembly and a camera module, and an electronic device therefor wherein there is a second gap between at least two adjacent group lens assemblies, so that the multi-group lens assembly can be stably assembled in actual production.

An object of the present invention is to provide a multi-group lens assembly and a camera module, and an electronic device therefor, wherein the first gap and the second gap communicate with each other, so that a connection medium can be adjusted in the space of the first gap and the second gap to facilitate stable assembling.

An object of the present invention is to provide a multi-group lens assembly and a camera module, and an electronic device therefor, wherein the providing of the first gap and the second gap enables the multi-group lens assembly to transform from a theoretical design to an actual product, and achieves the expected optical system design through a stable assembly process, which improves the product yield, and suitable for practical mass production applications.

An object of the present invention is to provide a multi-group lens assembly and a camera module, and electronic device therefor, wherein the size of the first gap is determined by the result of the AA calibration, and the group unit is brought closer to the first gap of a predetermined value during assembly, so that a relative determined position of the group unit finally meets the design requirements of the optical system.

An object of the present invention is to provide a multi-group lens assembly and a camera module, and an electronic device therefor, wherein the second gap is larger than the first gap, so that the connection medium can be moved from a position corresponding to the first gap to a position corresponding to the second gap during assembling, thereby alleviating an interaction force between the group units, so that the assembly process is more stable, and the mutual influence between the group units is small.

An object of the present invention is to provide a multi-group lens assembly and a camera module, and electronic device therefor, wherein the connection medium has elasticity to buffer the interaction force of assembly between the group units.

An object of the present invention is to provide a multi-group lens assembly and a camera module, and an electronic device therefor, wherein at least one adjusting element is provided between at least two adjacent group units, so that the first gap and the second gap are formed between the two group units.

An object of the present invention is to provide a multi-group lens assembly and a camera module, and electronic device therefor, wherein the adjusting element is selectively integrally provided in the group unit.

An object of the present invention is to provide a multi-group lens assembly and a camera module, and an electronic device therefor, wherein in some embodiments, the adjusting element is integrally provided on the group unit located above, and is protruded from an extension platform of the group unit at intervals.

An object of the present invention is to provide a multi-group lens assembly and a camera module, and an electronic device therefor, wherein in some embodiments, the adjusting element is integrally provided on the group unit located below, is protruded from an upper surface of the group unit at intervals.

An object of the present invention is to provide a multi-group lens assembly and a camera module, and an electronic device therefor, wherein a plurality of adjusting elements are provided between at least two adjacent group units, and each of the adjusting elements is symmetrically arranged, so that the force between the two group units is uniform.

In order to achieve the above at least one object of the present invention, an aspect of the present invention is to provide a multi-group lens assembly including:

at least two group units; at least one first gap between at least two adjacent group units to compensate for difference between the multi-group lens assembly and an optical design system, so that an optical system of the multi-group lens assembly conforms to the optical design system.

In the multi-group lens assembly according to some embodiments, the multi-group lens assembly includes two group units, which are a first group unit and a second group unit, respectively, wherein the first group unit includes a first bearing component and at least one first group lens, the first group lens is mounted in the first bearing component, and the second group unit includes a second bearing component and at least one second group lens, the second group lens is mounted in the second bearing component, so as to form two units of lens assembly separately.

In the multi-group lens assembly according to some embodiments, the first bearing component forms the first gap with the second bearing component, and a connection medium is provided in the first gap.

In the multi-group lens assembly according to some embodiments, the first bearing component includes a first main body and an extension platform, the extension platform forms the first gap with the second bearing component of the second group unit.

In the multi-group lens assembly according to some embodiments, the extension platform forms a ring structure.

In the multi-group lens assembly according to some embodiments, wherein the first main body has a first accommodating cavity, a first upper light passing hole and a first lower light passing hole, the first group lens is accommodated in the first accommodating cavity, the light passes through the first upper light passing hole to arrive at the first group lens, and passes through the first lower light passing hole to arrive at the second group unit.

In the multi-group lens assembly according to some embodiments, the second main body has a second accommodating cavity, a second upper light passing hole and a second lower light passing hole, the second group lens is accommodated in the second accommodating cavity, the light passing through the first group unit passes through the second upper light passing hole to arrive at the second group lens in the second group unit, and passes out of the second group unit through the lower light passing hole.

In the multi-group lens assembly according to some embodiments, the first main body below the extension platform extends into the second upper light passing hole of the second main body.

In the multi-group lens assembly according to some embodiments, the second bearing component includes an inner extension edge, the inner extension edge extends inwardly from the second main body to form the second upper light passing hole.

In the multi-group lens assembly according to some embodiments, the first main body forms a fourth gap with the inner extension edge, so that relative positions of the first group unit and the second group unit are adjusted.

In the multi-group lens assembly according to some embodiments, the extension platform forms the first gap with the inner extension edge.

In the multi-group lens assembly according to some embodiments, the multi-group lens assembly includes at least one adjusting element, the adjusting element is provided on the extension platform of the first group unit, and the adjusting element forms the first gap with the inner extension edge.

In the multi-group lens assembly according to some embodiments, at least two adjacent group units have at least one second gap, and the second gap communicates with the first gap.

In the multi-group lens assembly according to some embodiments, the adjusting element partially extends downwardly from the extension platform to form the first gap and second gap between the extension platform and the inner extension edge.

In the multi-group lens assembly according to some embodiments, wherein the extension platform of the first group unit forms the second gap with the inner extension edge of the second group unit.

In the multi-group lens assembly according to some embodiments, the multi-group lens assembly includes at least one adjusting element, the adjusting element is provided on the inner extension edge of the second bearing component, and the inner extension edge forms the first gap with the extension platform.

In the multi-group lens assembly according to some embodiments, the second bearing component includes an outer convex wall, the outer convex wall extends upwardly from the second main body to form an inner mounting groove, and the extension platform is accommodated in the inner mounting groove.

In the multi-group lens assembly according to some embodiments, the outer convex wall forms a third gap with the outer extension platform.

In the multi-group lens assembly according to some embodiments, the second bearing component includes an inner convex wall, and the inner convex wall extends upwardly from the second main body to form an outer mounting groove.

In the multi-group lens assembly according to some embodiments, the adjusting element partially extends downwardly from the exterior of the extension platform to form a U-shaped structure with the first main body.

In the multi-group lens assembly according to some embodiments, the adjusting element extends from the outer mounting groove.

In the multi-group lens assembly according to some embodiments, a connection medium is provided in the first gap, so as to fix the first group unit and the second group unit.

In the multi-group lens assembly according to some embodiments, the connection medium is one or more selected from the group consisting of UV glue, thermosetting glue, UV thermosetting glue, and epoxy glue.

In the multi-group lens assembly according to some embodiments, a connection medium is provided in the first gap and the second gap, so as to fix the first group unit and the second group unit.

In the multi-group lens assembly according to some embodiments, a connection medium is provided in the third gap, so as to fix the first group unit and the second group unit.

In the multi-group lens assembly according to some embodiments, the adjusting element is symmetrically arranged at intervals.

In the multi-group lens assembly according to some embodiments, the number of adjusting elements is one selected from 2, 3, 4, 5, 6, 7 and 8.

In the multi-group lens assembly according to some embodiments, the number of lenses of the multi-group lens assembly is 7.

In the multi-group lens assembly according to some embodiments, the number of the lenses of the first group unit is 4, and the number of the lenses of the second group unit is 3.

In the multi-group lens assembly according to some embodiments, the number of lenses of the first group unit and the second group unit is a combination selected from (4, 3), (3, 4), (6, 1), (1, 6), (5, 2), and (2, 5).

In the multi-group lens assembly according to some embodiments, the first group unit includes at least one first optical path element, which is arranged in cooperation with the lens to form a light path of the first group unit.

In the multi-group lens assembly according to some embodiments, the optical path element and the first group lens are alternately provided.

In the multi-group lens assembly according to some embodiments, the second group unit includes a second optical path element, which is arranged in cooperation with the second group lens to form a light path of the second group unit.

In the multi-group lens assembly according to some embodiments, the first bearing component has at least one reinforcing fixing groove corresponding to a position of the first group lens located at a bottom end of the first group unit, for accommodating a bonding medium to reinforce and fix the first group lens.

In the multi-group lens assembly according to some embodiments, the second bearing component has at least one reinforcing fixing groove corresponding to a position of the second group lens located at a bottom end of the second group unit, for accommodating a bonding medium to reinforce and fix the second group lens.

In the multi-group lens assembly according to some embodiments, the first group unit and the second group unit are assembled by active calibration.

Another aspect of the present invention is to provide a camera module including: a multi-group lens assembly; and a photosensitive component; wherein the multi-group lens assembly is located in a photosensitive path of the photosensitive component;

wherein the multi-group lens assembly includes at least two group units; at least one first gap is between at least two adjacent group units to compensate for a difference between the multi-group lens assembly and an optical design system, so that an optical system of the multi-group lens assembly conforms to the optical design system.

Another aspect of the present invention is to provide an electronic device including: a device main body; and a camera module, wherein the camera module cooperates with the device main body to implement image collection and reproduction.

In the electronic device according to some embodiments, the electronic device is one selected from the group consisting of a smart phone, a wearable device, a computer device, a television, a vehicle, a camera and a monitoring device.

DETAIL DESCRIPTION OF THE INVENTION

Figure 1:
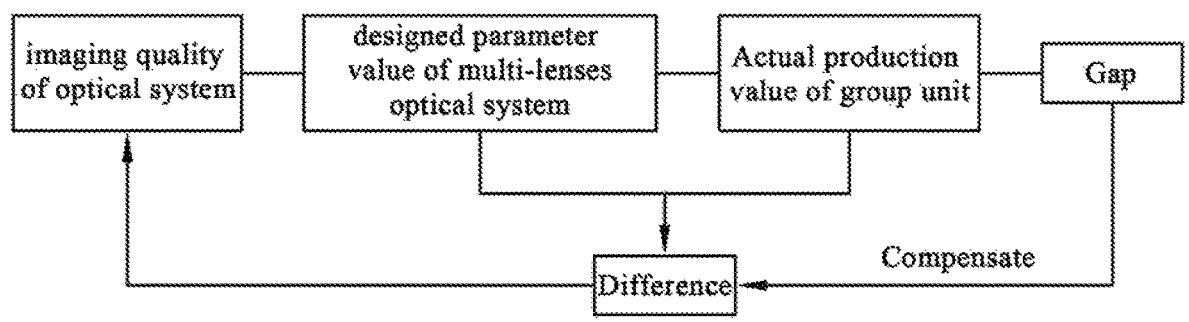
FIG. 1 is a block diagram of manufacturing principle of a multi-group lens assembly according to embodiments of the present invention.
Figure 2:
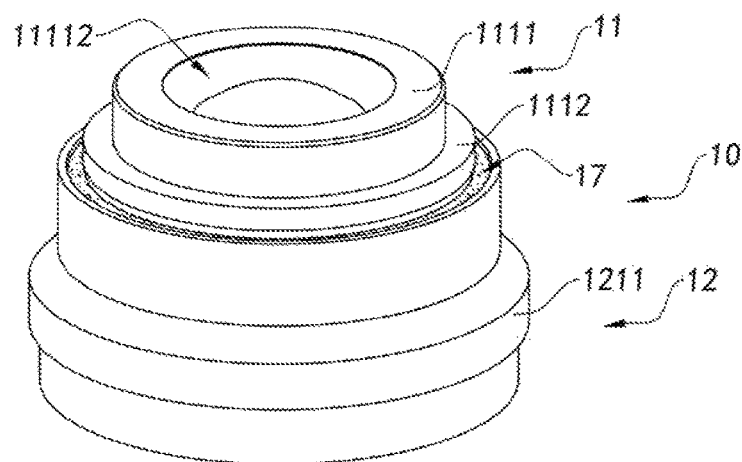
FIG. 2 is an overall perspective view of a multi-group lens assembly according to a first embodiment of the present invention.
Figure 3:
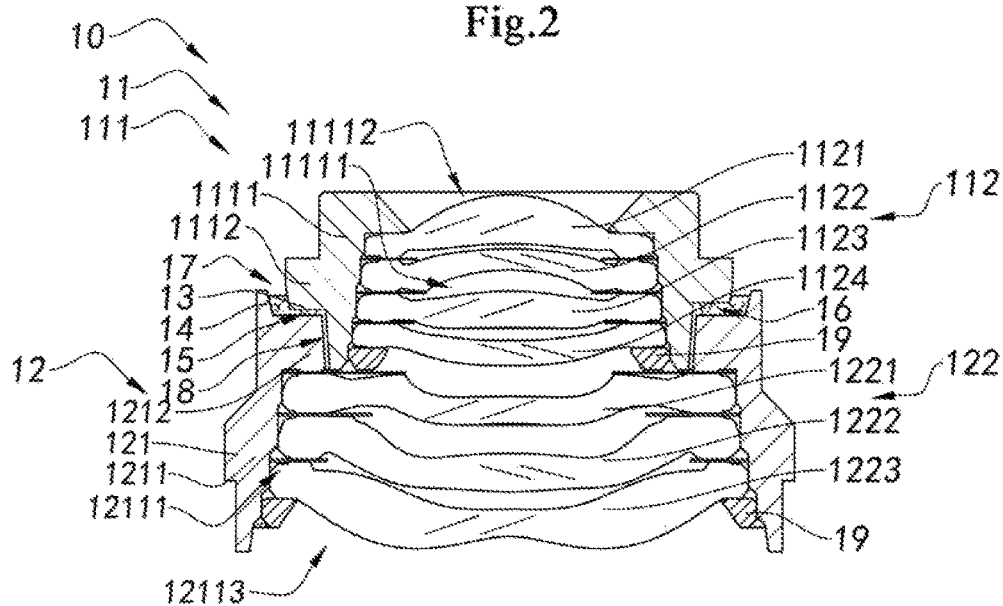
FIG. 3 is an overall cross-sectional view of the multi-group lens assembly according to the first embodiment of the present invention.
Figure 4A:
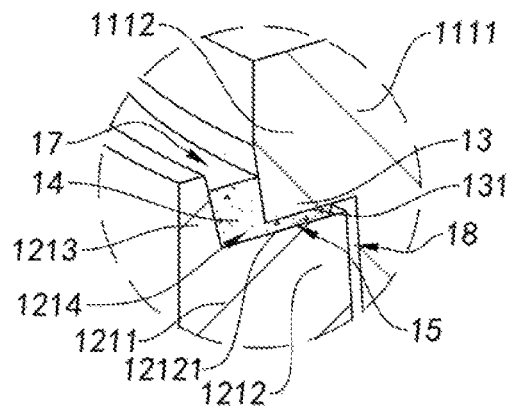
FIG. 4A is a partial enlarged view of a part of the multi-group lens assembly according to the first embodiment of the present invention, for illustrating a first gap and a third gap.
Figure 4B:
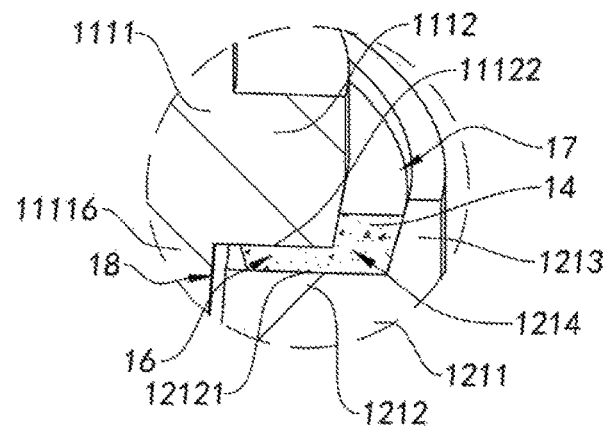
FIG. 4B is a partial enlarged view of a part of the multi-group lens assembly according to the first embodiment of the present invention, for illustrating a second gap and the third gap.
Figure 5:
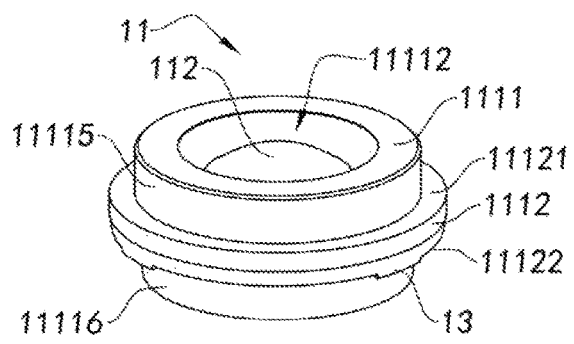
FIG. 5 is a perspective view of the first group unit of the multi-group lens assembly in an erected state according to the first embodiment of the present invention.
Figure 6:
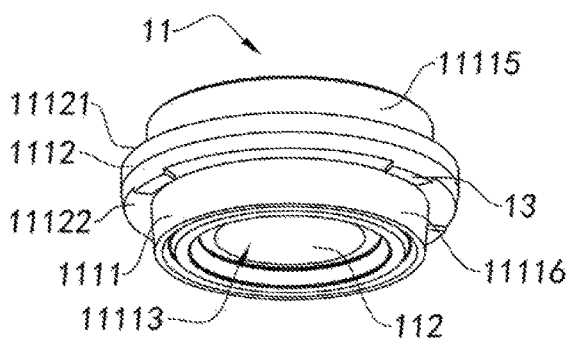
FIG. 6 is a perspective view of the first group unit of the multi-group lens assembly in an inverted state according to the first embodiment of the present invention.
Figure 7:
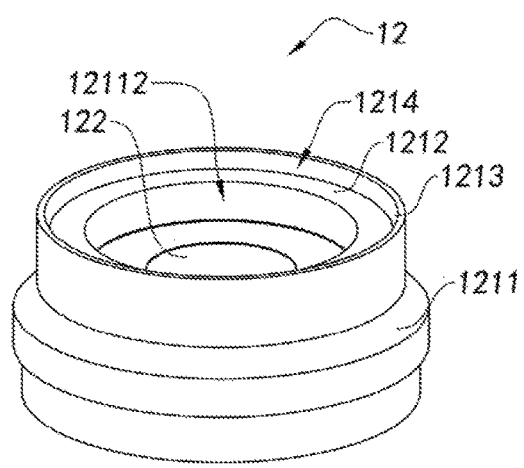
FIG. 7 is a perspective view of a second group unit of a multi-group lens assembly in an erected state according to the first embodiment of the present invention.
Figure 8:
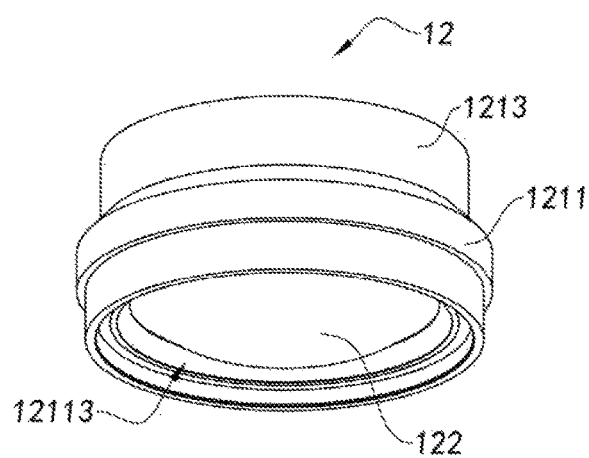
FIG. 8 is a perspective view of the second group unit of the multi-group lens assembly in an inverted state according to the first embodiment of the present invention.

The following description is presented to disclose the present invention to enable those skilled in the art to practice the present invention. The preferred embodiments in the following description are by way of embodiment only, and other obvious variations will occur to those skilled in the art. The basic principles of the present invention as defined in the following description may be applied to other embodiments, modifications, improvements, equivalents, and other technical solutions without departing from the spirit and scope of the present invention.

It should be understood by those skilled in the art that in the disclosure of the present invention, The orientation or positional relationship indicated by the terms "longitudinal", "transverse", "upper", "lower", "front", "back", "left", "right", "upright", "horizontal", "top", "bottom", "inside", "outside", etc. is based on the orientation or positional relationship shown in the drawings, which is only for the convenience of describing the invention and simplifying the description, rather than indicating or implying that the device or element referred to must have a particular orientation, be constructed and operate in a particular orientation, thus the above terms should not be construed as limiting the invention.

It will be understood that the term "a" is understood to mean "at least one" or "one or more", that is, in one embodiment, the number of one element may be one, and in other embodiments, the number of the element can be multiple, and the term "a" cannot be construed as limiting the quantity.

With a continuous development of smart devices, requirements for camera modules are getting higher and higher, and the corresponding lens assembly with multiple lenses has become an important trend in the development of an optical lens assembly. After designing optical systems with various performances in line with the expected range, the physical components and the corresponding manufacturing process are required to realize the theoretical design, which is indispensable for the actual manufacturing industry, and the actual production also in turn guides and corrects the theoretical design.

In general, the production of an optical lens assembly requires several important steps, such as the optical design process, the actual hardware design, and the actual production assembly process. Referring to FIG. 1, which is a schematic diagram of the design implementation process of the present invention, it takes a multi-group lens assembly provided by the present invention as an embodiment. Firstly, an optical design process is required to obtain optical system design parameters, which meet the expected requirements, such as meet expected imaging quality requirements. Learned in the design process, as the problem described in the background, the original lens assembly with fewer lenses cannot meet the design requirements, and then the optical system composed of a larger number of lenses is designed, and each lens parameter needs to meet the predetermined condition, such as designing an optical system composed of 6 pieces, 7 pieces and more pieces of lenses. However, for an integrated lens assembly of a traditional structure, due to structural limitations and limitations of the assembly manufacturing process, when multiple lenses, such as 6 pieces, 7 or more pieces are used, the imaging quality and the precision of the manufacturing process or the like cannot meet the design requirements of the optical system, and it is difficult to overcome. Therefore, the present invention breaks through the traditional integrated lens assembly structure in actual hardware design, to form an integrated lens assembly by at least two group units together, and relative positions of each group unit can be adjusted in space, for example, in a six-axis space, so that the overall cumulative error of the multi-group lens assembly is small, and the overall number of lenses is large, for example, it is easy to reach the design requirements of 6, 7 or more pieces. And further, the multi-group lens assembly provides a mating structure between the group units, so that the group units are stably combined, the optical paths are consistent, and stray light is prevent from entering into the interior from the jointing position of two groups units. And further, in the implementation component of the optical system, it is necessary to consider the limitation of the assembly process, the actual production situation, and in order to facilitate the later assembly adjustment, there is a predetermined difference between the actual production parameter value and the optical design parameter value of the group unit, and the two are not exactly the same, to provide the possibility of subsequent assembly adjustment. Further, when the multi-group lens assembly constitutes the camera module, a AA calibration is an important step to ensure a high imaging quality, and the multi-group lens assembly of the present invention is further provided with at least one first gap, which is provided between at least two adjacent group units, so as to compensate the inconsistency in optical imaging quality caused by the difference between the design parameter value and the actual production value through the first gap to cooperate with AA calibration process, thereby the imaging quality requirements of the actual product of the group unit meet the expected optical imaging quality requirements. Further, a multi-group unit needs to form an integrated lens assembly, which needs to be stably fixed, and the result after fixing needs to be consistent with that before fixing, so that the image quality is guaranteed, which is one of the important factors for ensuring the yield of the lens assembly or camera module product. Further, the multi-group unit of the present invention provides a connection medium, such as glue, provided in the first gap, so that the multi-group unit can be stably fixed. Further, the present invention provides a second gap, which is communicated with the first gap, so that the connection medium can move between the first gap and the second gap, so that the interaction force of each of the group units is small, and it is easier to obtain an expected mounting requirement, so that the image quality is guaranteed. Further, in some embodiments of the invention, the first gap and the second gap are formed, for example, it is integrally provided in the group unit by providing at least one adjusting element between the group units, so that the multi-lens optical system of the optical system design that meets the predetermined requirements is realized by the multi-group lens assembly of the present invention, and is applied to the actual production process, and can have good yield, especially suitable for product realization of multi-lens optical system, such as an optical system with 6, 7 or more pieces of lenses.

Of course, the present invention also proposes other improvements and brings many other advantages, and will not be enumerated here, and some embodiments will be described in detail by way of example to facilitate understanding of the present invention, but it should be understood by those skilled in the art that the specific structures in the following embodiments are merely illustrative and are not limitations of the inventive concept of the present invention.

For convenience of description and understanding, the following is an example of a multi-group lens assembly composed of two group units, and in other embodiments of the present invention, the multi-group lens assembly may include more group units, such as three, four or more, each of the group unit may be combined by the concept of the present invention, or may be combined by combining the concept of the present invention with other ways, and it should be understood by those skilled in the art that the number of group units is not a limitation of the present invention, and the scope of the present invention in combination with a multi-group lens assembly is not a limitation of the present invention.

As shown in FIGS. 2 to 11C, which is a multi-group lens assembly 10 according to a first embodiment of the present invention, the present invention provides a multi-group lens assembly 10 which is suitable for a multi-lens lens assembly, for example, with 6, 7 or more pieces of lenses. That is to say, the multi-group lens assembly 10 includes a plurality of lenses, such as 6, 7 or more pieces of lenses.

The multi-group lens assembly 10 is adapted to be assembled to form a camera module 100, and is particularly adapted to be assembled to form a camera module 100 with high pixels.

The multi-group lens assembly 10 includes at least two group units, each of which forms an integral optical system of the multi-group lens assembly 10 together. That is to say, the optical system of multi-lens is realized by a combination of at least two group units, instead of being implemented by a single lens assembly as a conventional integrated lens assembly.

It is worth mentioning that the lenses in each group unit of the multi-group lens assembly 10 can be allocated and combined according to different needs, such as various different distribution modes as illustrated in FIGS. 21A to 21E. In this embodiment of the present invention, only one of them is selected for description, and it should be understood by those skilled in the art that the number of lenses and the manner of distribution thereof are not limited by the present invention.

Further, there is a first gap 15 between at least two adjacent group units, and the first gap 15 compensates for a difference between the multi-group lens assembly 10 and the optical design system, so that the optical system of the multi-group lens assembly 10 conforms to the optical design system.

More specifically, the multi-group lens assembly 10 includes two group units, which are a first group unit 11 and a second group unit 12, respectively. When the first group unit 11 and the second group unit 12 constitute an integral lens assembly, the first group unit 11 is located above the second group unit 12, and the optical axis of the first group unit 11 and the second group unit 12 are consistent. That is to say, in this embodiment of the present invention, the optical system of the multi-group lens assembly 10 is composed of two optical systems corresponding to the first group unit 11 and the second group unit 12, respectively. That is to say, to a certain extent, when the first group unit 11 and the second group unit 12 are each independently present, the function of one integral lens assembly cannot be implemented, and when the first group unit 11 and the second group units 12 cooperate with each other, they constitute a integral lens assembly that can meet the imaging quality requirements.

Further, the first group unit 11 includes a first bearing component 111 and at least one first group lens 112, and the first group lens 112 is mounted in the first bearing component 111, so as to form an independent component. The second group unit 12 includes a second bearing component 121 and at least one second group lens 122. The second group lens 122 is mounted in the second bearing component 121, so as to form another independent component.

The first bearing component 111 is provided above the second bearing component 121, so that the optical paths of the first group unit 11 and the second group unit 12 are consistent.

There is a first gap 15 between the first group unit 11 and the second group unit 12, and the first gap 15 is used to compensate for the design difference between the multi-group lens assembly 10 and the optical design system, so that the imaging quality requirements of the actual optical system of the multi-group lens assembly 10 composed of the first group unit 11 and the second group unit 12 is consistent with that of the designed optical system.

More specifically, the first gap 15 is located between the first bearing component 111 and the second bearing component 121, so as to facilitate adjustment of the first bearing component 111 and the second bearing component 121.

The multi-group lens assembly 10 includes a connection medium 14 provided in the first gap 15, so that the first group unit 11 and the second group unit 12 are stably fixed. The connection medium 14 is exemplified by, but not limited to, one or more selected from the group consisting of UV glue, thermosetting glue, UV thermosetting glue, and epoxy glue.

The multi-group lens assembly 10 has a second gap 16 that communicates with the first gap 15, so that the connection medium 14 can be moved from a position corresponding the first gap 15 to a position corresponding to the second gap 16 during manufacturing, thereby reducing the interaction force between the first group unit 11 and the second group unit 12, and reducing the influence on the relative position.

More specifically, the second gap 16 is located between the first bearing component 111 and the second bearing component 121.

A height of the first gap 15 is greater than a height of the second gap 16, so that the connection medium 14 is moved from the position corresponding to the first gap 15 to the position corresponding to the second gap 16 during manufacturing, and a larger accommodating space is provided.

When the first group unit 11 and the second group unit 12 are assembled, the connection medium 14 is provided below the first bearing component 111 and/or above the second bearing component 121, the first group unit 11 and the second group unit 12 are then assembled at predetermined positions, so that their relative positions reach a predetermined position. In the process of bonding, the connection medium 14 is under the interaction force of the first group unit 11 and the second group unit 12, such as under the action of pressing, moves from a position corresponding to the first gap 15 to a position corresponding to the second gap 16. Since the height of the second gap 16 is greater than that of the first gap 15, an accommodating space of the connection medium 14 is expanded, so that the original interaction force at the position corresponding to the first gap 15 is alleviated.

It is worth mentioning that, during assembly, sizes of the first gap 15 and the second gap 16 are determined by requirements for the camera module 100 composed of the multi-group lens assembly 10 composed of the first group unit 11 and the second group unit 12. That is to say, at the time of assembly, the size of the gap is determined according to the focus result of the camera module 100, and the relative positions of the first group unit 11 and the second group unit 12 are adjusted, so that the first gap 15 meets predetermined requirement.

It is also worth mentioning that in the traditional integrated lens assembly, the lenses are successively mounted in the lens barrel, a range in which the lens can be adjusted is small, and once the lens is fixed, the relative position of the lens and the lens barrel is fixed. When all of the lenses are assembled, the cumulative error of the entire lens assembly is determined, and cannot be adjusted. In the present invention, the first group unit 11 and the second group unit 12 are each independently constituted without affecting each other, and when the first group unit 11 and the second group unit 12 are assembled into an integral lens assembly, the first group unit 11 and the second group unit 12 can be relatively adjusted, so that the lens assembly can be further calibrated to reduce the overall error, in particular, it is possible to perform adjustment of different directions of the three-dimensional space, such as the six-axis direction adjustment.

The multi-group lens assembly 10 includes at least one adjusting element 13, the adjusting element 13 is located between the first group unit 11 and the second group unit 12, so as to form the first gap 15 and the second gap 16. And the mutual influence of the first group unit 11 and the second group unit 12 in the process of combining with each other is reduced by the adjusting element 13. That is to say, when the first group unit 11 and the second group unit 12 are fixedly connected by the connection medium 14, the connection medium 14 is contacted by the adjusting element 13 instead of an entire flat bottom surface of the first group unit 11, so that comparing to the first group unit 11 without the adjusting element 13, the initial contact area between the first group unit 11 with the adjusting element 13 and the connection medium 14 is small, so that the interaction force when the first group unit 11 and/or the second group unit 12 are relatively adjusted is small, for example, during relative rotation or movement, the mutual pulling force brought by the viscous connection medium 14 is small, so that the adjustment of one of the group units has less influence on the other group unit, so that when the multi-group lens assembly 10 is calibrated by AA, the calibration standard is easily reached, and the calibration result is more accurate.

The first bearing component 111 includes a first main body 1111 and an outer extension platform 1112. The outer extension platform 1112 extends outwardly from the first main body 1111. In particular, the outer extension platform 1112 extends integrally horizontally outward from the first main body 1111, so that an annular brim structure is formed, for example, formed in an integrated manner by a die.

The outer extension platform 1112 can be provided at positions with different heights outside the first main body 1111, such as at positions with different heights of a bottom portion, a lower portion, near the lower portion, an upper portion, near the upper portion, and a middle portion. In this embodiment of the present invention, the outer extension platform 1112 is provided at a middle position outside the first main body 1111, and the first main body 1111 is divided into two parts, a part located above the outer extension platform 1112 and a part located below the outer extension platform 1112. After the first group unit 11 and the second group unit 12 are assembled, a part of the first main body 1111 located above the outer extension platform 1112 is in an external space, and a part of the first main body 1111 located below the outer extension platform 1112 extends into the second group unit 12.

The outer extensions platform 1112 can be set with different heights, for example, in some embodiments, a relatively small height is set, so that the top surface 11121 of the outer extension platform is lower than the top end of the first main body 1111. For example, in some embodiments, a relatively large height is set, so that the top surface 11121 of the outer extension platform is consistent with the top end of the first main body 1111, so that the upper portion of the multi-group lens assembly 10 has a different shape.

In this embodiment of the invention, the first main body 1111 and the outer extension platform 1112 can be manufactured in an integrated manner by a die. In other embodiments, the outer extension platform 1112 can be connected to the first main body 1111 by adhering. Of course, in other embodiments, the first main body 1111 and the outer extension platform 1112 may also be formed by other manners. It should be understood by those skilled in the art that the position and height of the outer extension platform 1112 and the manner in which the first main body 1111 and the outer extension platform 1112 are fixed are not limitations of the present invention.

Further, in this embodiment of the present invention, the first group lens 112 of the first group unit 11 includes four lenses, which are a first lens 1121, a second lens 1122, a third lens 1123 and a fourth lens 1124. The first lens 1121, the second lens 1122, the third lens 1123, and the fourth lens 1124 are sequentially arranged from top to bottom. In this embodiment and the accompanying drawings of the present invention, the first group unit 11 composed of four lenses is illustrated and described as an example. In other embodiments of the present invention, the number of lenses of the first group unit 11 may also be other numbers, such as 2, 3, 4, 5 or more pieces. It will be understood by those skilled in the art that the number of lenses of the first group unit 11 is not a limitation of the present invention.

The first main body 1111 has a first accommodating cavity 11111, a first upper light passing hole 11112 and a first lower light passing hole 11113. The first lens 1121, the second lens 1122, the third lens 1123, and the fourth lens 1124 are sequentially accommodated in the first accommodating cavity 11111 from top to bottom.

The first upper light passing hole 11112 is located at an upper portion of the first main body 1111 for communicating with the outside, so that light enters the first group unit 11, that is, the external light is made to arrive at the first lens 1121, the second lens 1122, the third lens 1123, and the fourth lens 1124 in the first accommodating cavity 11111.

The first lower light passing hole 11113 is located at a lower portion of the first main body 1111 and communicates with the second group unit 12, so that light passing through the first group unit 11 arrives at the second group unit 12.

In other words, in this embodiment, the first lens 1121 is adjacent to the first upper light passing hole 11112, and the fourth lens 1124 is adjacent to the first lower light passing hole 11113.

Further, in this embodiment of the invention, the second group lens 122 of the second group unit 12 includes three lenses, which are a fifth lens 1221, a sixth lens 1222 and a seventh lens 1223, respectively. The fifth lens 1221, the sixth lens 1222, and the seventh lens 1223 are sequentially arranged from top to bottom. In this embodiment and the accompanying drawings of the present invention, the second group unit 12 composed of three lenses is illustrated and described as an example. In other embodiments of the present invention, the number of lenses of the second group unit 12 may also be other numbers, such as 2, 3, 4, 5 or more pieces. It will be understood by those skilled in the art that the number of lenses of the second group unit 12 is not a limitation of the present invention.

The second main body 1211 has a second accommodating cavity 12111, a second upper light passing hole 12112 and a second lower light passing hole 12113. The fifth lens 1221, the sixth lens 1222, and the seventh lens 1223 are sequentially accommodated in the second accommodating cavity 12111 from top to bottom.

The second upper light passing hole 12112 is located at an upper portion of the second main body 1211 for communicating with the first group unit 11, so that the light passing through the first group unit 11 arrives at the second group unit 12, that is, the light arrives at the fifth lens 1221, the sixth lens 1222 and the seventh lens 1223 located in the second accommodating cavity 12111.

The second lower light passing hole 12113 is located at a lower portion of the second main body 1211 and communicates with the outside, so that the light passing through the second group unit 12 arrives at the outside, for example, arrives at the photosensitive element 22 of the camera module 100, thereby the first group unit 11 and the second group unit 12 form a integral optical system.

That is to say, in this embodiment of the present invention, the first lens 1121, the second lens 1122, the third lens 1123, and the fourth lens 1124 of the first group unit 11 constitutes an integrated optical system composed of 7 lenses with the fifth lens 1221, the sixth lens 1222 and the seventh lens 1223 of the second group unit 12, and functions as an integral lens assembly.

In this embodiment of the present invention, the first group unit 11 includes at least one first optical path element 113, the first optical path element 113 is provided adjacent to the lens, so as to form a predetermined light path on the lens. For example, the first optical path element 113 can be a space ring that blocks the light of the edge of the lens and forms a predetermined light path at center of the lens. The first optical path element 113 can be a coating that optically covers the edge of the lens to form a predetermined light path at the center of the lens. In other words, The first optical path element 113 is provided in cooperation with the lens, so as to form a predetermined light path in the lens.

More specifically, in this embodiment of the invention, the first group unit 11 includes three of the first optical path elements 113 provided between two adjacent lenses, respectively, for example, provided between the first lens 1121 and the second lens 1122, between the second lens 1122 and the third lens 1123, and between the third lens 1123 and the fourth lens 1124, respectively.

The second group unit 12 includes at least one second optical path element 123, the second optical path element 123 is provided at a position adjacent to the lens, so as to form a predetermined light path on the lens. For example, the second optical path element 123 can be a space ring that blocks light at the edge of the lens and forms a predetermined light path at the center of the lens assembly. The second optical path element 123 can be a coating that optically covers the edge of the lens to form a predetermined light path at the center of the lens.

More specifically, in this embodiment of the invention, the second group unit 12 includes three of the second optical path elements 123 provided between two adjacent lenses, respectively, for example, provided at the top of the fourth lens 1124, between the fourth lens 1124 and the fifth lens 1221, between the fifth lens 1221 and the sixth lens 1222, and between the sixth lens 1222 and the seventh lens 1223, respectively. In particular, the optical path element between the third lens 1123 and the fourth lens 1124 is provided on a top surface of the fourth lens 1124, so that the external light is blocked from the first group and the second group bonding position to arrive at the lens of the multi-group lens assembly 10. The second optical path element 123 can be a space ring, an opaque coating, such as a black glue layer, etc., it will be understood by those skilled in the art that the type of the second optical path element 123 is not a limitation of the present invention.

Further, the second bearing component 121 includes an inner extension edge 1212 extending inwardly from the second main body 1211 to form the second upper light passing hole 12112. In particular, the inner extension edge 1212 is formed integrally by extending inwardly from the second main body 1211, such as formed in an integrated manner by a die.

According to this embodiment of the invention, the first main body 1111 of the first bearing component 111 of the first group unit 11 extends into the second upper light passing hole 12112, the outer extension platform 1112 of the first bearing component 111 of the first group unit 11 is continued from the inner extension edge 1212 of the second bearing component 121 of the second group unit 12, so that the first group unit 11 and the second group unit 12 form a mating structure.

Further, the first gap 15 and the second gap 16 are provided between the outer extension platform 1112 of the first bearing component 111 of the first group unit 11 and the inner extension edge 1212 of the second bearing component 121 of the second group unit 12.

More specifically, the adjusting element 13 is provided below the outer extension platform 1112, located between the outer extension platform 1112 of the first bearing component 111 and the inner extension edge 1212 of the second bearing component 121. More specifically, in this embodiment of the invention, the adjusting element 13 extends integrally downwardly from the outer extension platform 1112, so that the first gap 15 is formed between the bottom surface 131 of the adjusting element and the top surfaces 12121 of the inner extension edge of the second bearing component, and the second gap 16 is formed between a bottom surface 11122 of the outer extension platform of the first bearing component 111 and a top surface 12121 of the inner extension edge of the second bearing component 121.

In another embodiment of the present invention, the adjusting member 13 may be provided under the outer extension platform 1112 by adhering, that is to say, not be provided on the outer extension platform 1112 by an integrated molding manner.

The first main body 1111, the outer extension platform 1112, and the adjusting element 13 may be connected to each other in an integrated molding manner by a die, or may be connected in a fixed manner by an adhering medium. The constituent materials of the first main body 1111, the outer extension platform 1112, and the adjusting element 13 may be the same, for example, they are all made of plastic, or they may be different materials. It should be understood by those skilled in the art that the present invention is not limited in these aspects.

In other embodiments, the adjusting element 13 may be provided on the second group unit 12, for example, the adjusting element 13 is provided on the top surface 12121 of the inner extension edge of the second group unit 12, so that a space between the outer extension platform 1112 of the first group unit 11 and the inner extension edge 1212 of the second group unit 12 is partitioned into a plurality of the first gap 15 and a plurality of the second gaps 16. For example, the bottom surface 131 of the adjusting element forms the first gap 15 with the bottom surface 11122 of the outer extension platform of the first group unit 11, the second gap 16 is formed between the bottom surface 11122 of the outer extension platform of the first group unit 11 and the top surface 12121 of the inner extension edge of the second group unit 12. Further, in this manner, the connection medium 14 may be provided in the first gap 15 and the second gap 16, so that the first group unit 11 and the second group unit 12 are connected stably. It will be understood by those skilled in the art that the location of the adjusting element 13 is not a limitation of the invention.

Further, the multi-group lens assembly 10 includes a plurality of the adjusting elements 13 symmetrically arranged under the outer extension platform 1112, so that when the first group unit 11 and the second group unit 12 are combined, the interaction force is uniform. A plurality of the adjusting elements 13 separate a space between the outer extension platform 1112 and the inner extension edge 1212 of the second group unit 12 into a plurality of the first gaps 15 and a plurality of the second gaps 16.

More specifically, in this embodiment of the present invention, the multi-group lens assembly 10 includes a plurality of the adjusting elements 13, for example, 2, 3, 4, or more. Each of the adjusting elements 13 is symmetrically provided below the outer extension platform 1112. Each of the adjusting elements 13 is spaced apart below the outer extension platform 1112, and the space between the outer extension platform 1112 of the first group unit 11 and the inner extension edge 1212 of the second group unit 12 is partitioned into four of the first gaps 15 and four of the second gaps 16.

The second bearing component 121 includes an outer convex wall 1213, the outer convex wall 1213 extends upwardly from the outside of the second main body 1211 and forms an inner mounting groove 1214 with the inner extension edge 1212. The outer extension platform 1112 of the first group unit 11 is accommodated in the inner mounting groove 1214.

In this embodiment of the present invention, the outer convex wall 1213 is an annular wall, and correspondingly, the inner mounting groove 1214 is an annular groove. The annular outer convex wall 1213 is provided to form an accommodating space of the connection medium 14, so that the first group unit 11 and the second group unit 12 can be connected and fixed in a vertical direction, the connection is more stable, and the connection medium 14 does not flow to outside.

Figure 20:
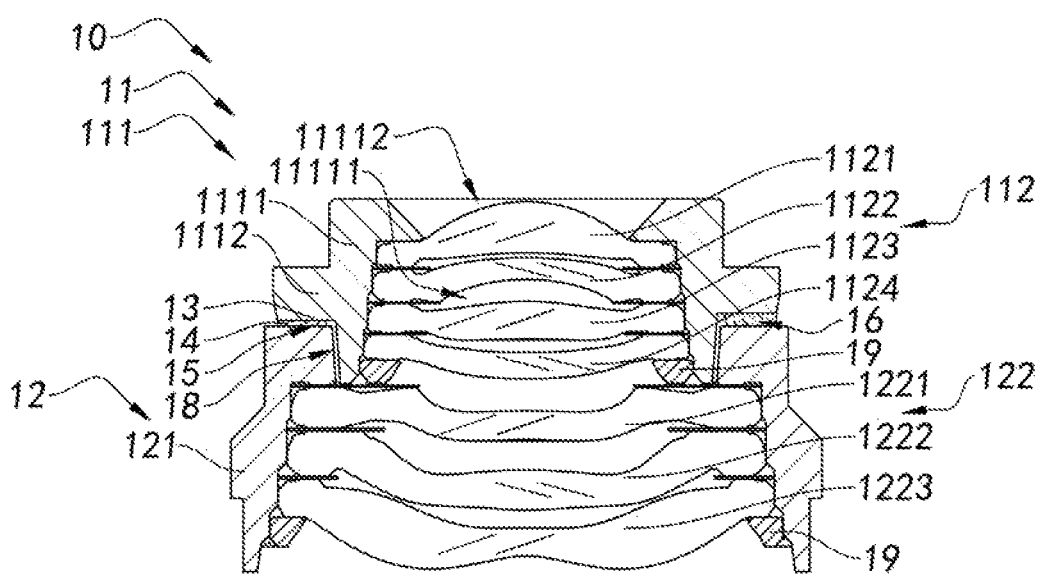
FIG. 20 is a cross-sectional view of a multi-group lens assembly according to a fourth embodiment of the present invention.
Figure 21A:
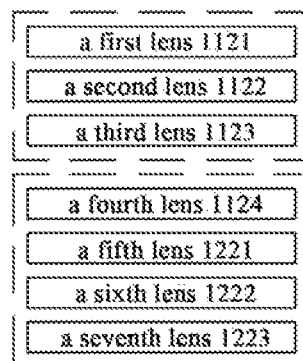
FIGS. 21A to 21E are block diagrams of different lens arrangement manner of the multi-group lens assembly according to the above-described embodiments of the present invention.
Figure 21B:
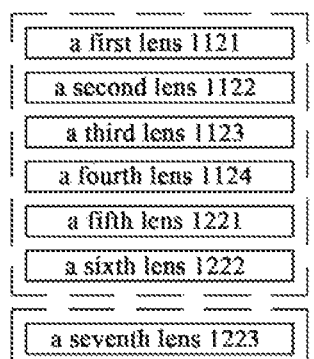
Figure 21C:
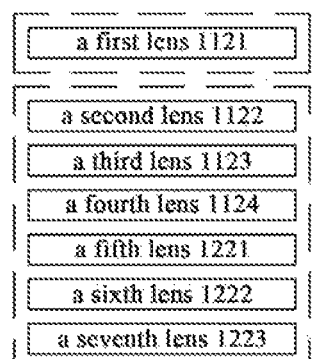
Figure 21D:
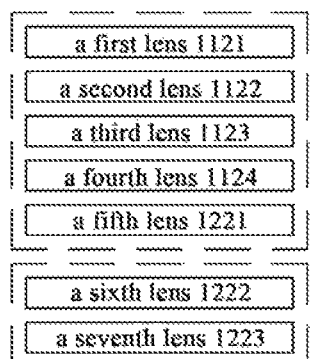
Figure 21E:
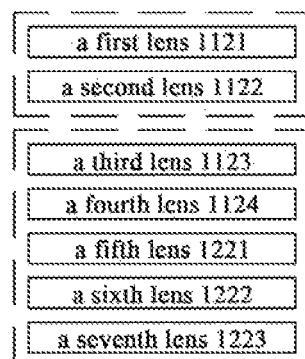

In other embodiments of the present invention, the outer convex wall 1213 may be other structures, such as spaced convex structures, it will be understood by those skilled in the art that the structure of the outer convex wall 1213 is not a limitation of the present invention. Of course, in other embodiments, the outer convex wall 1213 may not be provided, referring to FIG. 20, in the fourth embodiment of the present invention, the second bearing component 121 does not include the outer convex wall 1213, that is to say, the top surface of the second group unit 12 is flat and is a flat extending plane.

There is a third gap 17 between the outer convex wall 1213 and the outer extension platform 1112 of the first bearing component 111 of the first group unit 11 to facilitate the assembly of the first group unit 11 and the second group unit 12.

For example, in some embodiments, the connection medium 14 is provided in the third gap 17, so that the connection of the first group unit 11 and the second group unit 12 is more stable. In some embodiments, the connection medium 14 is a UV glue, and the third gap 17 is in communication with the outside to provide a larger exposure area for the connection medium 14, so that the connection medium 14 reaches stable performance more quickly.

It is worth mentioning that, in the present invention, the outer extension platform 1112 divides the first main body 1111 into two parts, a main body upper portion 11115 and a main body lower portion 11116, respectively. The main body upper portion 11115 is located above the outer extension platform 1112, and the main body lower portion 11116 is located below the outer extension platform 1112. When the first group unit 11 is combined with the second group unit 12, the main body lower portion 11116 extends into the second upper light passing hole 12112 of the first group unit 11, an outer extension platform 1112 extends over the second group unit 12 and the inner extension edge 1212. For example, the outer extension platform 1112 is supported on the inner extension edge 1212 of the second group unit 12, and the outer extension platform 1112 is accommodated in the outer convex wall 1213 and the inner extension edge 1212 of the second main body 1211 unit to form the inner mounting groove 1214. Thereby, a mating structure is formed between the first group unit 11 and the second group unit 12, so that the first group unit 11 and the second group unit 12 are stably and cooperatively assembled to form an integral lens assembly.

The mating structure of the first group unit 11 and the second group unit 12 brings many advantages, for example, the main body lower portion 11116 of the first main body 1111 extends into the second upper light passing hole 12112, the second upper light passing hole 12112 limits the position of the first main body 1111, so that the first group unit 11 and the second group unit 12 are easier to assemble accurately. The first main body 1111 extends into the second group unit 12, so that the distance between the lens in the first group unit 11 and the lens in the second group unit 12 is reduced, thereby reducing the total optical length. The first main body 1111 extends into a gap between the lens at the most bottom part of the first group unit 11 the lens at the most top part of the second group unit 12 to deeply control, so that the optical system of the multi-group lens assembly 10 conforms to the optical design system requirement, for example, controlling a gap between the fourth lens 1124 and the fifth lens 1221, so that a gap between the fourth lens 1124 and the fifth lens 1221 meets a predetermined requirement. An extension platform 1112 extends over the inner extension edge 1212, and can provide support for the outer extension platform 1112 through the inner extension edge 1212, that is, the first group unit 11 is stably supported by the second group unit 12, the depth of extension of the first group unit 11 into the second group unit 12 can be adjusted by the setting position of the outer extension platform 1112. The first group unit 11 extends into the second group unit 12, so that the external stray light is blocked by the first main body 1111 of the first group unit 11 from entering the multi-group lens assembly 10 through the combined position of the first group unit 11 and the second group unit 12, and has a better light shielding effect. The outer convex wall 1213 is located outside the outer extension platform 1112 to prevent the connection medium 14 from leaking to the outside, and the outer convex wall 1213 further blocks the external stray light to enter the multi-group lens assembly 10 through the combined position of the first group unit 11 and the second group unit 12.

It is also worth mentioning that there is a fourth gap 18 between the main body lower portion 11116 of the first group unit 11 and the inner extension edge 1212 of the second group unit 12, so as to adjust the positions of the first group unit 11 and the second group unit 12 in a horizontal direction, and due to a third gap 17 between the outer extension platform 1112 of the first group unit 11 and the outer convex wall 1213 of the second group unit 12, the relative positions of the first group unit 11 and the second group unit 12 can be adjusted relatively freely in a space, for example, be adjusted mutually in the six-axis direction, and the adjustment of the inner tilt angle can also be in a certain range. Thus, the adjustment range of the first group unit 11 and the second group unit 12 is relative large, thereby making the optical axes of the first group unit 11 consistent with that of the second group unit 12, and/or it is easy to make the optical system composed of the first group unit 11 and the second group unit 12 meet predetermined requirements and improve imaging quality, which are all unattainable by the traditional integrated lens assembly.

Further, according to still another embodiment of the present invention, the first main body 1111 of the first group unit 11 may have at least one first reinforcing groove provided at a bottom position of the first main body 1111. The first reinforcing groove is used for accommodating a bonding medium to reinforce and fix the lens at the bottom end. For example, in this embodiment of the present invention, the first reinforcing groove is provided at a position corresponding to the fourth lens 1124, so that the fourth lens 1124 is reinforced and fixed by providing the bonding medium in the first reinforcing groove. The adhering medium and the connection medium 14 may be a same substance or different substances. It should be understood by those skilled in the art that the material types of the connection medium 14 and the adhering medium are not limitations of the present invention.

Further, in other embodiments, the first main body 1111 may have a plurality of the first reinforcing grooves spaced and symmetrically arranged at a bottom position of the first main body 1111, so that the lens is uniformly stressed. For example, four of the first reinforcing grooves are symmetrically arranged at the bottom position of the first main body

1111. Of course, the number of the first reinforcing grooves may also be other numbers, and the first reinforcing groove can be different shapes, such as a trapezoid, a semicircle, a square, a triangle or a polygon, etc. The first reinforcing groove may also be an annular communicating groove. It will be understood by those skilled in the art that the specific shape and number of the first reinforcing grooves are not limitations of the present invention. The first reinforcing groove may further be a reinforcing fixing hole penetrating the first main body 1111, and the fourth lens 1124 is reinforced and fixed by providing the adhering medium to the reinforcing fixing hole.

Further, according to other embodiments of the present invention, the second main body 1211 of the second group unit 12 may have at least one second reinforcing groove provided at a bottom position of the second main body 1211. The second reinforcing groove is used for accommodating the adhering medium to reinforce and fix the lens at the bottom end. For example, in this embodiment of the invention, the second reinforcing groove is provided at a position corresponding to the seventh lens 1223, so that the seventh lens assembly 1223 is reinforced and fixed by providing the adhering medium in the second reinforcing groove. The adhering medium and the connection medium 14 may be a same substance or different substances. It should be understood by those skilled in the art that the material types of the connection medium 14 and the adhering medium are not limitations of the present invention.

Further, in other embodiments, the second main body 1211 has a plurality of the second reinforcing grooves spaced and symmetrically arranged at a bottom position of the first main body 1111. For example, the four reinforcing grooves are symmetrically arranged at the bottom position of the second main body 1211. Of course, the number of the second reinforcing grooves may be other numbers, and the second reinforcing groove may be different shapes, such as a trapezoid, a semicircle, a square, a triangle or a polygon, etc. The second reinforcing groove may also be an annular communicating groove. It will be understood by those skilled in the art that the specific shape and number of the second reinforcing groove are not limitations of the present invention. The second reinforcing groove may further be a reinforcing fixing hole penetrating the second main body 1211, and the seventh lens 1223 is reinforced and fixed by providing the adhering medium to the reinforcing fixing hole.

Further, the first group unit 11 and the second group unit 12 may each include a pressing ring 19 for fixing the lenses located at the bottom of the first group unit 11 and the bottom of the second group unit 12, respectively, for example, fixing the first fourth lens 1124 and the seventh lens 1223. In other words, The pressing ring 19 is provided at a position adjacent to the lens at the bottom end, so as to support and fix the lens at the bottom of the lens.

Figure 9:
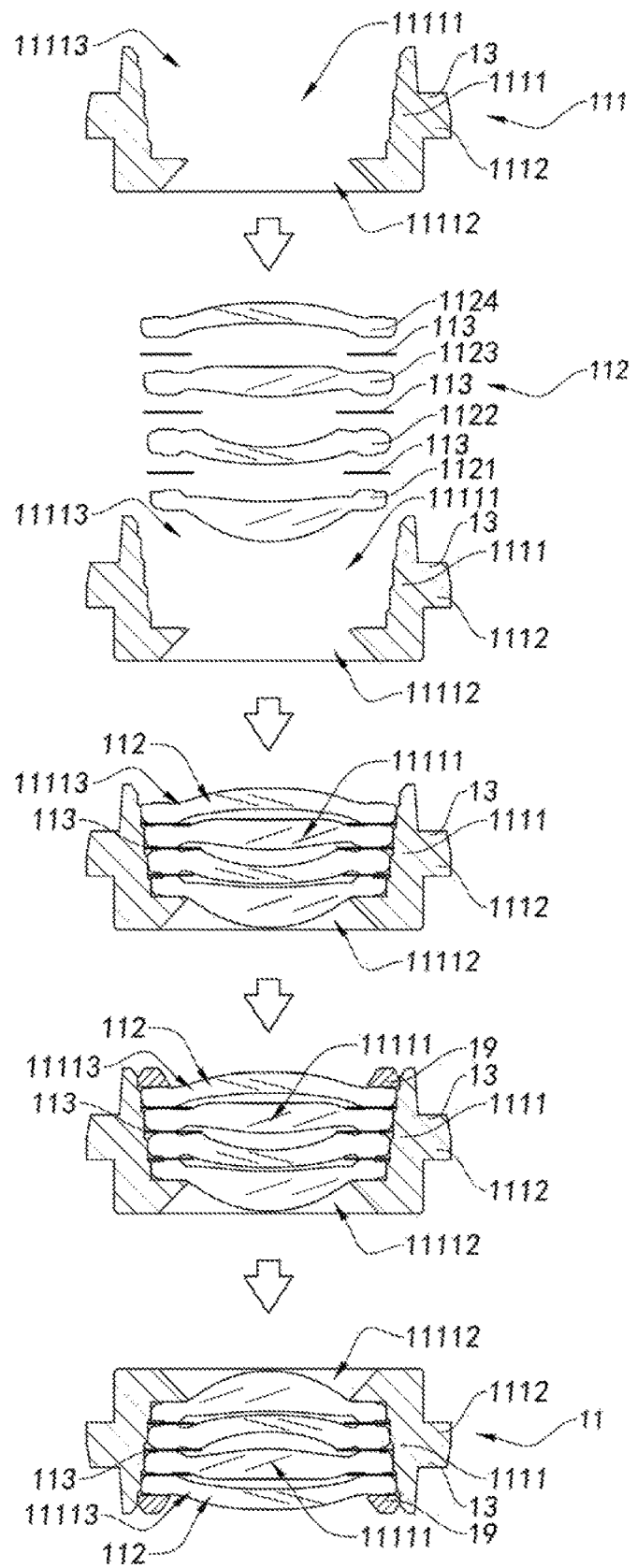
FIG. 9 is a schematic view of the assembly process of the first group unit according to the first embodiment of the present invention.

For example, referring to FIG. 9, the assembly process of the first group unit 11 can be the following. The first bearing component 111 is first inverted on an assembly worktable, and then the first lens 1121 is assembled to a corresponding position of the first bearing component 111, so that the first lens 1121 is accommodated in the first accommodating cavity 11111, and the first lens 1121 is adjusted to meet a predetermined requirement and then fixed, and then the first optical path element 113 is provided at a position corresponding to the first lens 1121, and continues to assemble the second lens 1122, the other first optical path element 113, the third lens 1123, the other first optical path element 113 and the fourth lens 1124. After assembling the fourth lens 1124, applying an adhering medium, such as glue, to the first reinforcing groove corresponding to the fourth lens 1124 to reinforce and fix the fourth lens 1124, so that the fourth lens 1124 at the bottom of the first main body 1111 is stably connected. And the pressing ring 19 may be first provided, and then the adhering medium is provided for fixing at a position where the pressing ring 19 is located, thereby implementing the assembly of the first group unit 11.

It is worth mentioning that, for the sake of clarity, in this embodiment and the drawings of the present invention, the multi-group lens assembly 10 composed of the first group unit 11 with four lenses and the second group unit 12 with three lenses is described as an example, but in other embodiments of the present invention, the first group unit 11 may include other numbers of lenses, such as one, two, three or more pieces. The second group unit 12 can include other numbers of lenses, such as one, two, three or more pieces. Each of the lenses may be the same lens or different lenses designed according to the requirements of the optical system.

After the first group unit 11 and the second group unit 12 are obtained by assembling, the multi-group lens assembly 10 of the present invention can be obtained by assembling the first group unit 11 and the second group unit 12. The multi-group lens assembly 10 may be assembled separately or may be formed during the process of assembling the camera module 100.

For example, in one way, the assembly process of the multi-group lens assembly 10 can be the following.

The connection medium 14, such as a UV thermosetting glue is first applied in the inner mounting groove 1214 of the second group unit 12, then the first group unit 11 is overlapped with the second group unit 12, and the positions of the first group unit 11 and the second group unit 12 are made to be cooperated with each other, for example, so that the outer extension platform 1112 of the first group unit 11 corresponds to the inner mounting groove 1214 of the second group unit 12, the main body lower portion 11116 of the first main body 1111 extends into the second upper light passing hole 12112 of the second group unit 12. Active calibration of the first group unit 11 and the second group unit 12 are further performed, so that the optical axes of the first group unit 11 and the second group unit 12 are consistent. Further, the connection medium 14 is provided in the third gap 17. Further, the first group unit 11 and the second group unit 12 are pre-fixed, for example, the third gap 17 is irradiated with ultraviolet light to pre-cure the connection medium 14. Finally, the first group unit 11 and the second group unit 12 are cured and fixed, for example, the first group unit 11 and the second group unit 12 are fixed in a baking manner by heating, thereby obtaining the multi-group lens assembly 10. With such a method, the multi-group lens assembly 10 including more group units can be assembled.

For example, in another way, the assembly process of the multi-group lens assembly 10 can be the following.

Firstly, active calibration of the first group unit 11 and the second group unit 12 are performed, so that the relative positions of the first group unit 11 and the second group unit 12 are determined, and then the connection medium 14 is applied to the inner mounting groove 1214 of the second group unit 12, and the first group unit 11 and the second group unit 12 are further provided at an actively calibrated position. Further, the first group unit 11 and the second group unit 12 are pre-fixed, such as by ultraviolet light irradiation, and finally, the first group unit 11 and the second group unit 12 are fixed, for example, the first group unit 11 and the second group unit 12 are fixed in a baking manner by heating.

Figure 10:
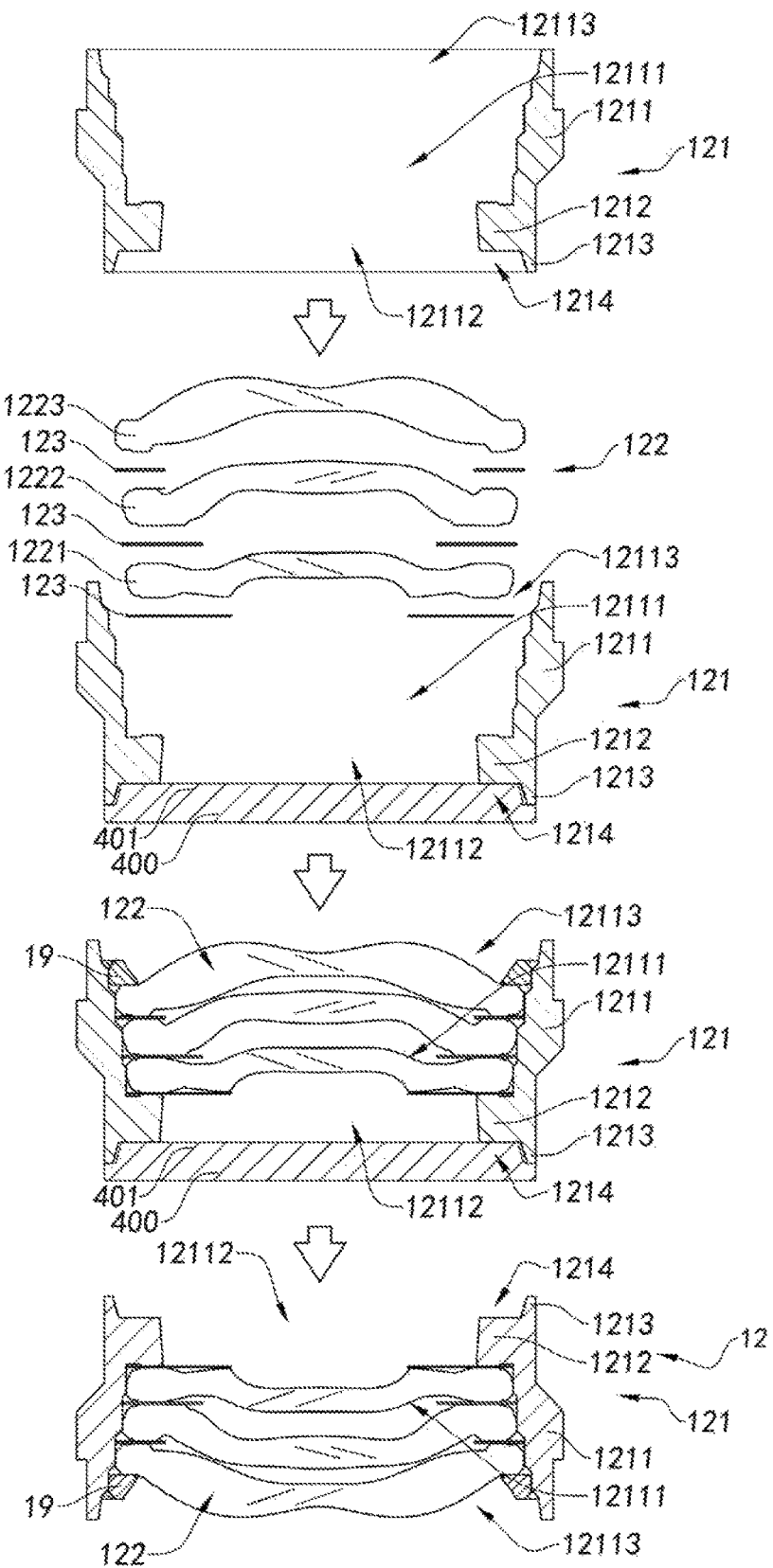
FIG. 10 is a schematic view of the assembly process of the second group unit according to the first embodiment of the present invention.

As shown in FIG. 10, it is a schematic view of an assembly process of the second group unit 12 of the multi-group lens assembly 10 according to the above-described embodiment of the present invention. In order to facilitate the fixed assembly of the second group unit 12, the present invention provides an assembly fixture 400 that cooperates with the upper end structure of the second group unit 12, so that when the second main body 1211 of the second group unit 12 is inverted, it can be stably supported.

The assembly fixture 400 has a bearing protrusion 401 that cooperates with the inner mounting groove 1214 of the second bearing component 121 of the second group unit 12, so that when the second supporting member 121 is inverted on the assembly fixture 400, the bearing protrusion 401 is accommodated in the inner mounting groove 1214, and supported by the inner extension edge 1212 of the second bearing component 121, so that the second bearing component 121 is stably and reversely supported.

The bearing protrusion 401 may be an annular structure that cooperates with the annular inner mounting groove 1214. Of course, when the inner mounting groove 1214 is of other structures, the bearing protrusions 401 can be correspondingly set as a mating structure.

For example, the assembly process of the second group unit 12 can be the following. The second bearing component 121 of the second group unit 12 is first inverted on the assembly fixture 400, then the second optical path element 123 is mounted in the second bearing component 121, and then the fifth lower lens is mounted in the second bearing component 121, and continuously, the other optical path element, the sixth lens 1222, the other optical path element, and the seventh lens 1223 are sequentially assembled. After the assembly of the seventh lens 1223 is implemented, the adhering medium needs to be applied to the second reinforcing groove to reinforce and fix the seventh lens 1223.

Figure 11A:
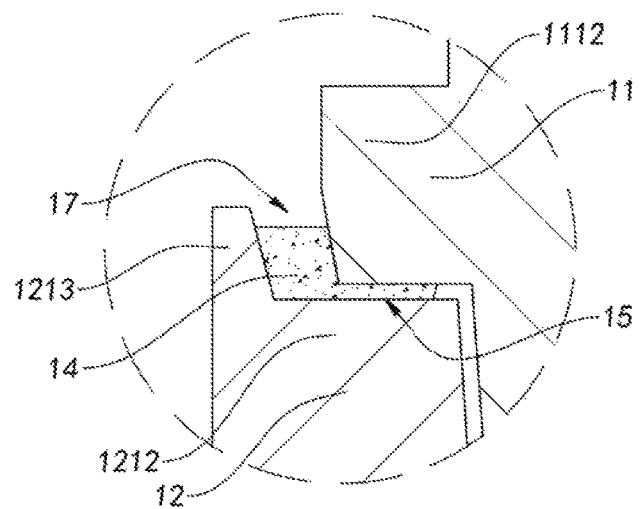
FIGS. 11A to 11C are schematic views of different fixing manners of two group units according to the first embodiment of the invention.
Figure 11B:
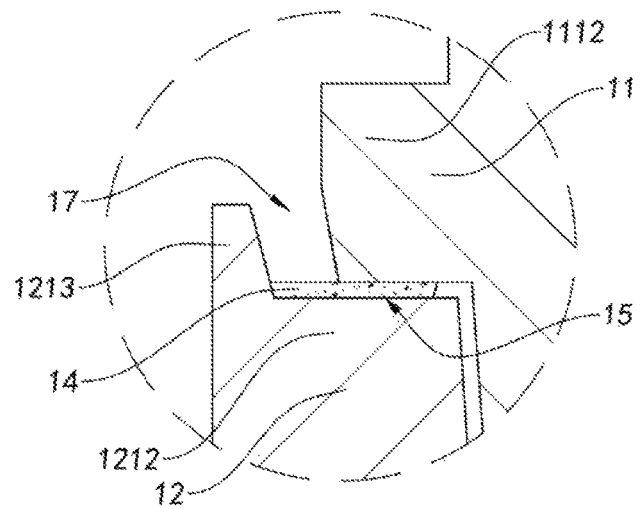
Figure 11C:
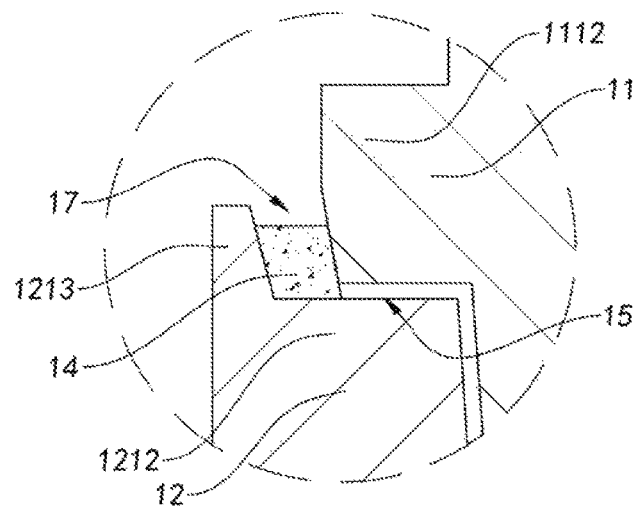

Referring to FIGS. 11A to 11C, different ways in which the connection medium 14 can be provided are illustrated. In one way, referring to FIG. 11A, two connection media are mainly provided between the outer extension platform 1112 of the first group unit 11 and the inner extension edge 1212 of the second group unit 12, and between the outer extension platform 1112 of the first group unit 11 and the outer convex wall 1213 of the second group unit 12, that is, the connection medium 14 is provided in the first gap 15 and the second gap 16 as well as the third gap 17.

In another way, referring to FIG. 11B, the connection medium 14 is mainly provided between the outer extension platform 1112 of the first group unit 11 and the inner extension edge 1212 of the second group unit 12, that is, the connection medium 14 is provided in the first gap 15 and the second gap 16.

In one way, referring to FIG. 11C, the connection medium 14 is mainly provided between the outer extension platform 1112 of the first group unit 11 and the outer convex wall 1213 of the second group unit 12, that is, the connection medium 14 is provided in the third gap 17.

It is worth mentioning that the providing position of the connection medium 14 is related to the multi-group lens assembly 10 and the assembly method of the camera module 100 composed of the multi-group lens assembly, for example, in the manner shown in FIG. 11A, the AA calibration may be performed on the first group unit 11 and the second group unit 12, and then the connection medium 14 is provided in the second group unit 12, after assembling the first group unit 11 and the second group unit 12, the connection medium 14 is further provided in the third gap 17 and further fixed, so that the first gap 15, the second gap 16, and the three gaps 17 are all filled by the connection medium 14. That is to say, in this way, the AA calibration is performed firstly, and the glue is applied for fixation, and then complemented to strengthen the fixation. For example, in FIG. 11B, the AA calibration may be first performed on the first group unit 11 and the second group unit 12, and then the connection medium 14 is provided in the second group unit 12, after the first group unit 11 and the second group unit 12 are assembled, the connection medium 14 is not further provided in the third gap 17, so that only the first gap 15 and the second gap 16 are filled with the connection medium 14. For example, in FIG. 11C, the connection medium 14 can be directly applied to the third gap 17 during AA adjustment, so that the first group unit 11 and the second group unit 12 are fixedly connected.

It can be understood that the filling amount of the connection medium 14 in the first gap 15, the second gap 16, and the third gap 17 is not a limitation of the present invention. In the above embodiments and the accompanying drawings, it is only an example to illustrate the possible location of the connection medium 14 and is not absolute. In the specific manufacturing process, one or more of the first gap 15 and the second gap 16 and the third gap 17 may be respectively filled due to the amount and the providing position of the connection medium 14 provided.

Figure 12:
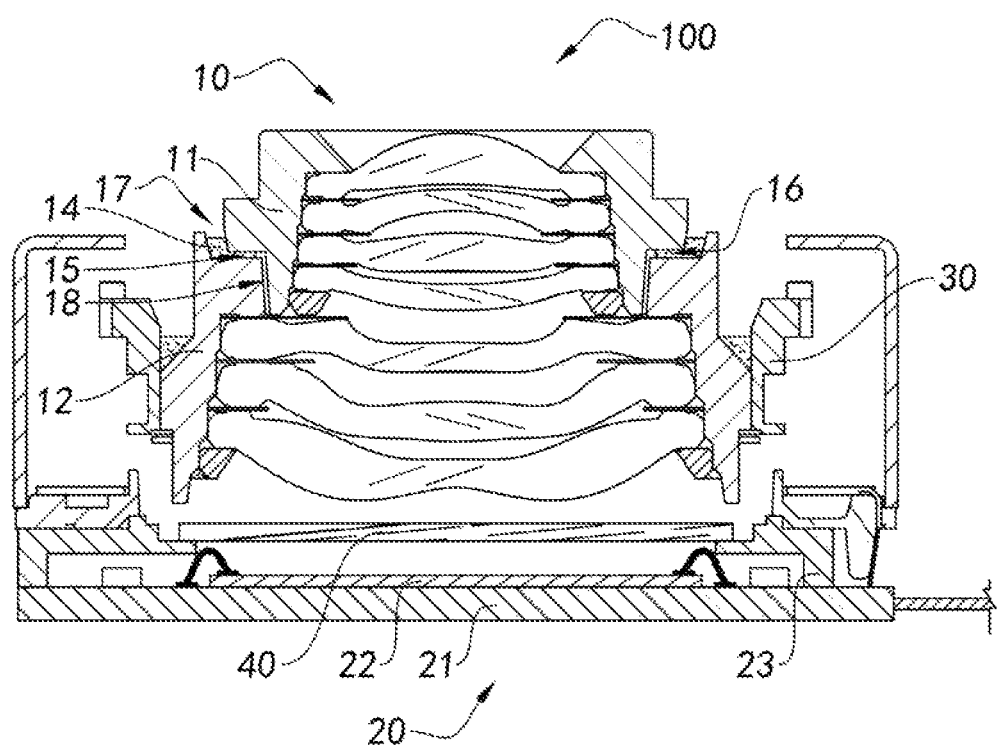
FIG. 12 is a schematic view of a camera module constructed by the multi-group lens assembly according to the first embodiment of the present invention.

As shown in FIG. 12, a camera module 100 is composed of the multi-group lens assembly 10 of the present invention. The camera module 100 includes a multi-group lens assembly 10, a photosensitive component 20, a lens assembly bearing element 30, and a filter element 40.

The multi-group lens assembly 10 is mounted in the lens assembly bearing element 30, and the filter element 40 is provided between the multi-group lens assembly 10 and the photosensitive component 20, so that the light passing through the multi-group lens assembly 10 is filtered by the filter element 40, and the lens assembly bearing element 30 is mounted on the photosensitive component 20, so that the multi-group lens assembly 10 is positioned in the photosensitive path of the photosensitive component 20.

In some embodiments, the lens assembly bearing element 30 can be a driving element, such as a piezoelectric motor or a voice coil motor to facilitate forming an autofocus camera module. When the lens assembly bearing element 30 is a driving element, the lens assembly bearing element 30 is electrically connected to the photosensitive component 20, so as to obtain driving energy through the photosensitive component 20.

In some embodiments, the lens assembly bearing element 30 can be a fixed element, so as to form a fixed focus camera module 100.

Of course, in some embodiments, the lens assembly bearing element 30 may be omitted, and the multi-group lens assembly 10 may be directly mounted on the photosensitive component 20 to form a fixed focus camera module 100.

According to this embodiment of the present invention, the photosensitive component 20 includes a circuit board 21, a photosensitive element 22, and a lens assembly holder 23. The photosensitive element 22 is electrically connected to the circuit board 21, so as to implement the photoelectric conversion process. For example, in some embodiments, the photosensitive element 22 is mounted on the circuit board 21 by a surface mount process SMT, and is electrically connected to the circuit board 21 through a connection gold wire. In some embodiments, the photosensitive element 22 may be provided on the circuit board 21 by means of a Flip Chip (FC). Of course, the photosensitive element 22 and the circuit board 21 may also have other structural relationships, and the invention is not limited in this aspect.

The filter element 40 is mounted on the lens assembly holder 23 above the photosensitive element 22. The lens assembly holder 23 is mounted on the circuit board 21. The lens assembly bearing element 30 is mounted on the lens assembly holder 23 to facilitate providing a mounting position through the lens assembly holder 23.

Figure 13:
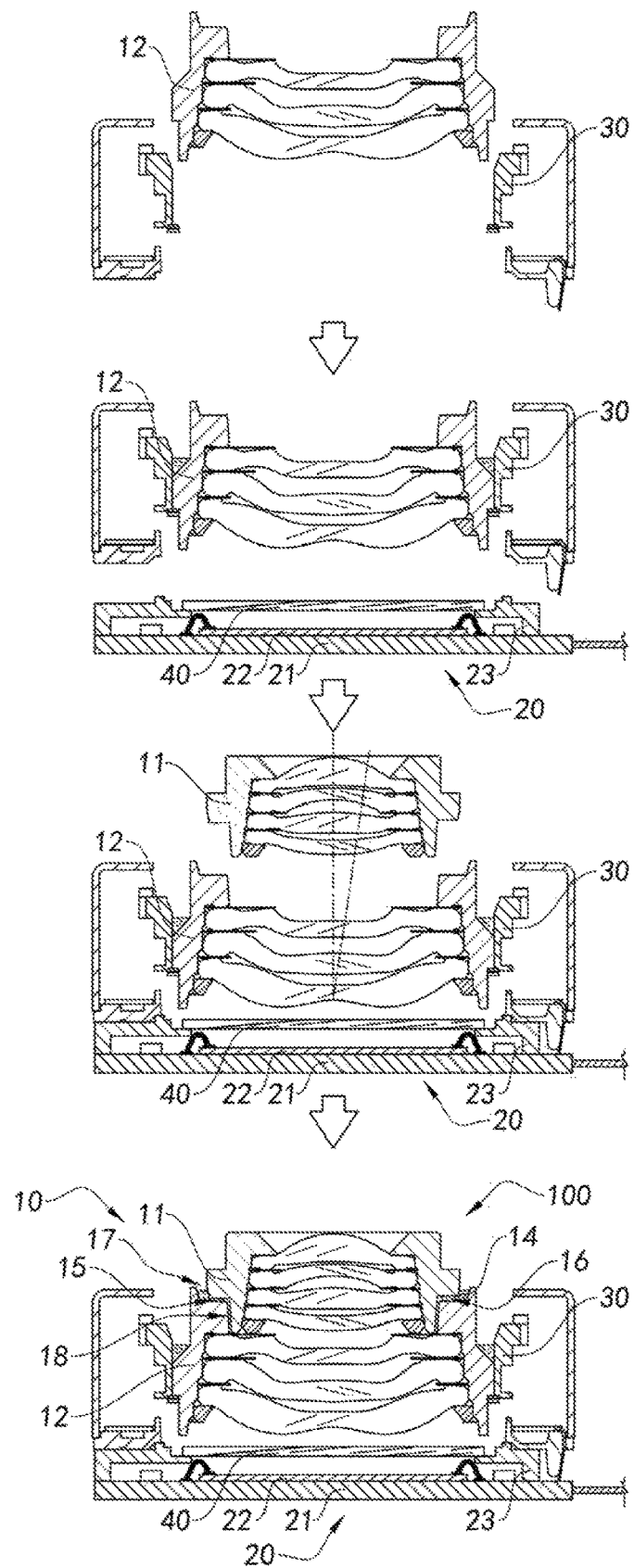
FIG. 13 is a schematic view of an assembly process of the camera module constructed by the multi-group lens assembly according to the above embodiment of the present invention.

For example, in some embodiments, referring to FIG. 13, the assembly process of the camera module 100 may be performed by first forming the photosensitive component 20, for example, the photosensitive assembly 20 is assembled by assembling the photosensitive element 22, the circuit board 21 and the lens assembly holder 23, and then the second group unit 12 is assembled to the lens assembly bearing element 30. Further, the lens assembly bearing element 30 with the second group unit 12 is mounted on the photosensitive component 20, such as adhesively fixed to the photosensitive component 20, and then the first group unit 12 is provided on the second group unit 11, and AA calibration is performed on the multi-group lens assembly to determine a relative position of the first group unit 11 and the second group unit 12, and record the relative position. Further, The connection medium 14 is provided between the first group unit 11 and the second group unit 12, so that the first group unit 11 and the second group unit 12 are stably fixed, thereby the connection medium 14 is squeezed and filled in the first gap 15 and the second gap 16 and the third gap 17 formed by the first group unit 11 and the second group unit 12. Further, a fixed curing process of the connection medium 14 may be provided, for example, the connection medium 14 is irradiated by ultraviolet light through the third gap 17, and fixed by baking, so that the first group unit 11 and the second group unit are stably connected and fixed by the connection medium 14. In particular, when the first bearing component 111 is a driving component, the first bearing component 111 needs to be electrically connected to the photosensitive component 20, so that the first bearing component 111 obtains driven energy from the photosensitive component 20.

In other words, in this assembly manner, the multi-group lens assembly 10 is simultaneously assembled in the process of assembling the camera module 100, and when the camera module 100 is assembled, the camera module 100 is optically calibrated by adjusting the relative positions of the first group unit 11 and the second group unit 12, that is, by adjusting the multi-group lens assembly 10, the imaging quality of the camera module 100 meets the predetermined standard, which is completely unachievable in the camera module 100 composed of the traditional integrated lens assembly.

It is worth mentioning that, as performing the AA calibration, the AA calibration may be performed by adjusting the first group unit 11, or may be formed by adjusting the overall assembly with the second group unit 12 and the photosensitive component 20. That is to say, after the first group unit 11 is mounted on the second group unit 12, two independent integral assemblies are formed to constitute the camera module 100, and the AA calibration can be implemented by adjusting the upper portion or the lower portion, of course, the AA calibration can also be implemented by adjusting the two portions simultaneously. It will be understood by those skilled in the art that in the process of the AA calibration, relatively adjusted objects, such as first group unit 11 and/or second group unit 12, are not limitations of the present invention.

Figure 14:
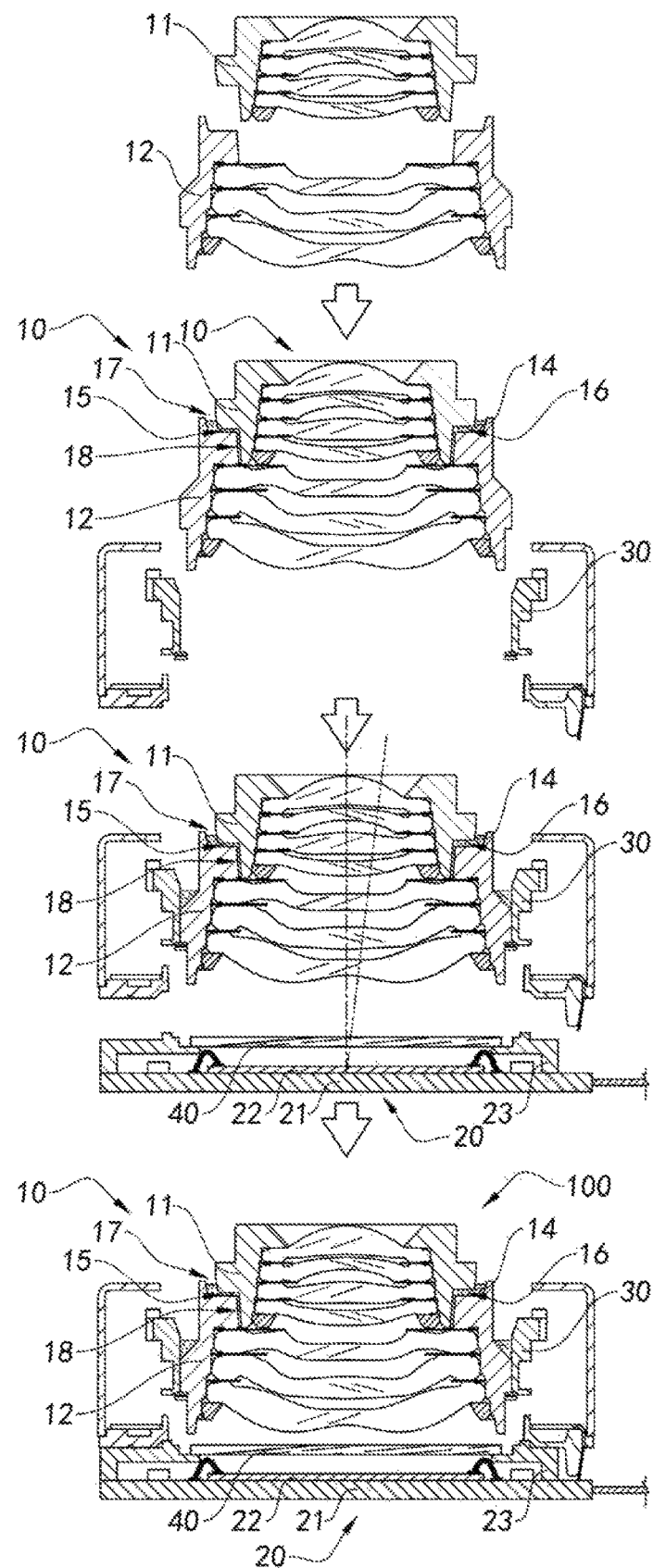
FIG. 14 is a schematic view of another assembly process of the camera module constructed by the multi-group lens assembly according to the above embodiment of the present invention.

In other embodiments, referring to FIG. 14, the assembly process of the camera module 100 may be performed by assembling the first group unit 11 and the second group unit 12 to form the multi-group lens assembly 10 firstly, and then assembling the multi-group lens assembly 10 to the first bearing component 111, and then performing the AA calibration when assembling the first bearing component 111 carried with the multi-group lens assembly 10 and the photosensitive assembly 20, it should be understood by those skilled in the art that the order of the assembly flow of the camera module 100 is not a limitation of the present invention.

Figure 15:
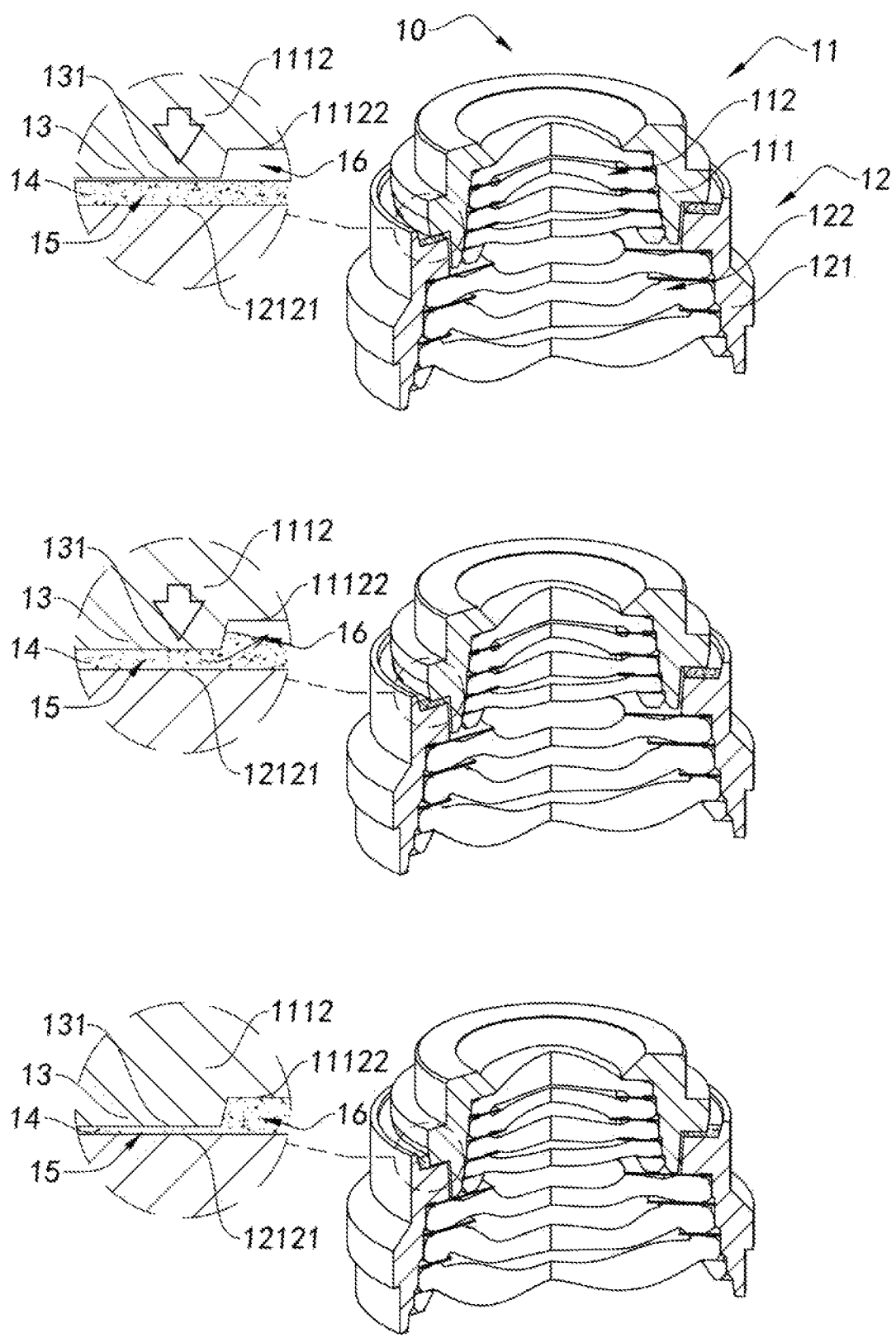
FIG. 15 is a schematic view of variations in positions of the gap between the multi-group lens assemblies in the above-described adjustment process according to the present invention.

It is worth mentioning that, referring to FIG. 15, a predetermined amount of the connection medium 14 is provided on a top surface of the second group unit 12, that is, a top surface 12121 of the inner extension edge during assembly, when the first group unit 11 is assembled to the second group unit 12, a gap between the first group unit 11 and the second group unit 12 and the connection medium 14 change gradually under the interaction of the first group unit 11 and the second group unit 12, and finally the first gap 15 and the second gap 16 and the third gap 17 with a certain distance are formed. For example, in the process of the first group unit 11 being close to the second group unit 12, the bottom surface 131 of the adjusting element 13 below the outer extension platform 1112 of the first group unit 11 firstly contacts with the connection medium 14, and as the first group unit 11 gradually approaches the second group unit 12, the connection medium 14 moves under the action of the adjusting element 13, expands to the space where the second gap 16 is located, and fills the second gap 16 until the first gap 15 meets a predetermined range of the AA calibration, that is, the first group unit 11 is made to arrive at the position recorded during the AA calibration. It can be understood that, in this process, since the first gap 15, the second gap 16, the third gap 17, and the fourth gap 18 are in communication with each other, the connection medium 14 can move between the first gap 15, the second gap 16, the third gap 17, and the fourth gap 18, and since the connection medium 14 has elasticity, so as to make the interaction force of the first group unit 11 and the second group unit 12 relatively moderate, and the adjusting element 13 reduces the contact area where the first group unit 11 and the second group unit 12 interact with each other, so that when the first group unit 11 and the second group unit 12 are assembled, little influence is on the holding positions of the first group unit 11 and/or the second group unit 12, so as to get closer to the relative position of the previous AA calibration. When more connection medium 14 is applied, the connection medium 14 provides a better buffer function for the first group unit 11 and the second group unit 12, and the second gap 16 provides an accommodating space for the connection medium 14, so that the distance of the first gap 15 can reach a distance corresponding to a predetermined AA calibration position, such as a relatively small distance, and due to the movement of the connection medium 14, the connection medium 14 does not create a large resistance to the first group unit 11 and the second group unit 12.

The providing of the adjustment element 13 and the first gap 15 and the second gap 16 enables the multi-group lens assembly 10 and the camera module 100 composed of the multi-group lens assembly 10 to be performed the AA calibration in actual production process, and a better AA calibration effect can be achieved, and the production yield of the multi-group lens assembly 10 and the camera module 100 is improved, which is suitable for mass production applications.

Figure 16:
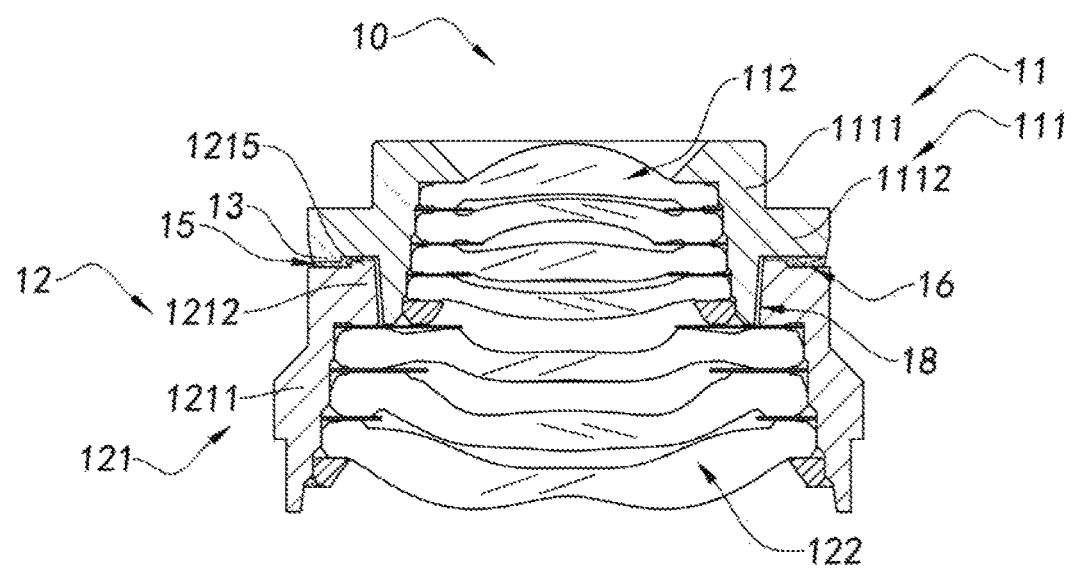
FIG. 16 is a cross-sectional view of a multi-group lens assembly according to a second embodiment of the present invention.
Figure 17A:
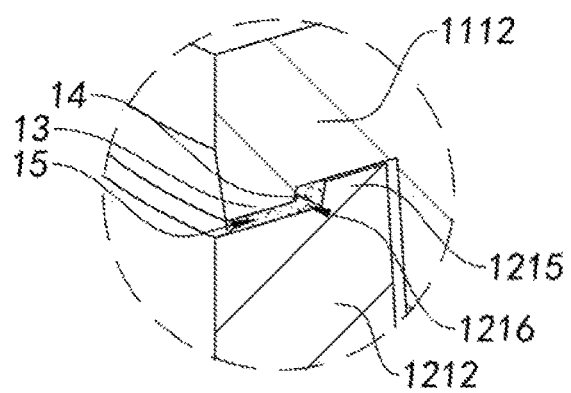
FIG. 17A is a partial enlarged schematic view of a part of the multi-group lens assembly according to the second embodiment of the present invention, for illustrating a first gap and a third gap.
Figure 17B:
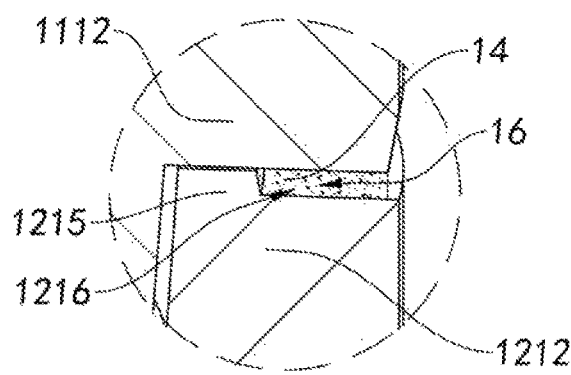
FIG. 17B is a partial enlarged schematic view of a part of the multi-group lens assembly according to the second embodiment of the present invention, for illustrating a second gap and the third gap.

As shown in FIGS. 16 to 17B, a multi-group lens assembly 10 according to a second embodiment of the present invention is illustrated. In this embodiment, the second bearing component 121 includes an inner convex wall 1215, the inner convex wall 1215 extends upwardly from the outside of the second body 1211 and forms an outer mounting groove 1216 with the inner extension edge 1212. The outer extension platform 1112 of the first group unit 11 is accommodated in the outer mounting groove 1216. That is, the inner convex wall 1215 partially extends upwardly from the inner extension edge 1212 of the second bearing component 121 to form the outer mounting groove 1216 that communicates with the outside.

In this embodiment of the present invention, the inner convex wall 1215 is an annular wall, and correspondingly, the outer mounting groove 1216 is an annular groove. In other embodiments of the present invention, the inner convex wall 1215 may be other structures, such as spaced convex structures, it will be understood by those skilled in the art that the structure of the convex wall is not a limitation of the present invention.

Further, the adjusting element 13 is provided below the outer extension platform 1112 of the first bearing component 111 of the first group unit 11 and partially extends downwardly from the outer extension platform 1112.

Further, the adjusting element 13 extends downwardly from the outer portion of the outer extension platform 1112, that is to say, in this manner, there is a gap between the adjusting element 13 and the outer wall of the first main body 1111, instead of being integrally connected, so as to cooperate with the structure of the second bearing component 121 of the second group unit 12. Specifically, the outer extension platform 1112 and the first main body 1111 form a U-shaped structure so as to accommodate the inner convex wall 1215 of the second bearing component 121 of the second group unit 12.

There is the fourth gap 18 between the lower portion of the first main body 1111 and the inner convex wall 1215 so as to adjust the assembling of the first group unit 11 and the second group unit 12.

Figure 18:
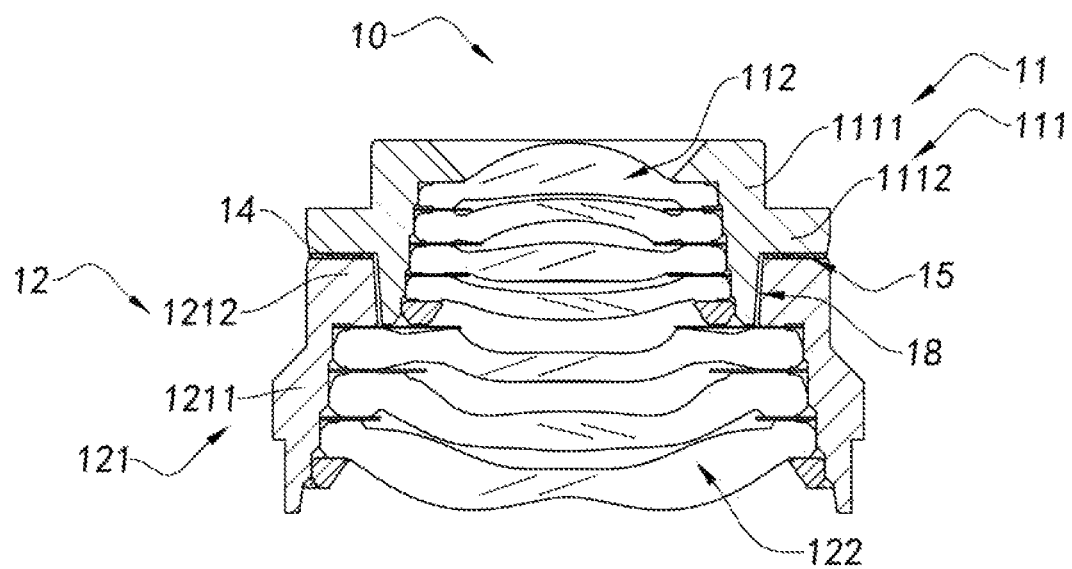
FIG. 18 is a cross-sectional view of a multi-group lens assembly according to a third embodiment of the present invention.
Figure 19:
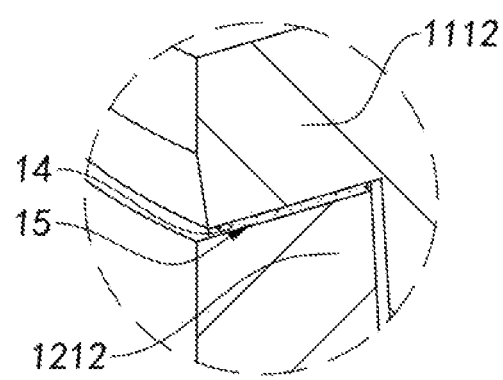
FIG. 19 is a partial enlarged schematic view of the multi-group lens assembly according to the third embodiment of the present invention, for illustrating a first gap.

As shown in FIGS. 18 and 19, a multi-group lens assembly 10 in accordance with a third embodiment of the present invention is illustrated. In this embodiment, the outer extension platform 1112 of the first bearing component 111 of the first group unit 11 forms the first gap 15 with the inner extension edge 1212 of the second bearing component 121 of the second group unit 12, and the connection medium 14 is provided in the first gap 15 to compensate for the difference between the actual production value and the optical design value of the multi-group unit by the AA calibration, so that the imaging quality meets optical design requirements.

Further, the surface of the second bearing component 121 of the second group unit 12 is an extended plane that cooperates with the outer extension platform 1112.

That is to say, in this embodiment, the first group unit 11 has no obvious adjusting element 13, and by controlling the height of the outer extension platform 1112, the height cooperating relationship of the first group unit 11 and the second group unit 12 and the position of the first gap 15 formed are controlled.

In other words, the second group unit 12 does not have the outer convex wall 1213, so that the top surface of the second group unit 12 forms a flat planar extension structure.

In this embodiment, an assembling method of the multi-group lens assembly 10 can be the following. The connection medium 14 is first provided on a top surface of the second group unit 12, that is, a top surface of the inner extension edge 1212, and then the first group unit 11 is provided in the second group unit 12, so that the first group unit 11 extends into the second group unit 12. Further, the AA calibration is performed to the first group unit 11 and/or the second group unit 12, so that the imaging quality of the multi-group lens assembly 10 formed by the first group unit 11 and the second group unit 12 meets expected requirements. That is, the first gap 15 is made to meet the requirement of compensating for the difference. The connection medium 14 is then cured, so that the first group unit 11 is stably connected to the second group unit 12.

Referring to FIGS. 21A to 21E, in the above embodiments and the accompanying drawings, the first group unit 11 being four pieces of lenses and the second group unit 12 being three pieces of lenses is taken as an example, and in the other embodiments of the present invention, the number of lenses of the first group unit 11 and the second group unit 12 may be other numbers.

For example, in one embodiment, the first group unit 11 includes 3 pieces of lenses, which are a first lens 1121, a second lens 1122, and a third lens 1123. The second group unit 12 includes 4 pieces of lenses, which are a fourth lens 1124, a fifth lens 1221, a sixth lens 1222 and a seventh lens 1223. The first lens 1121, the second lens 1122, the third lens 1123, the fourth lens 1124, the fifth lens 1221, the sixth lens 1222, and the seventh lens 1223 constitute an optical system with 7 pieces of lenses.

For example, in one embodiment, the first group unit 11 includes 6 pieces of lenses, which are a first lens 1121, a second lens 1122, a third lens 1123, a fourth lens 1124, a fifth lens 1221 and a sixth lens 1222. The second group unit 12 includes a seventh lens 1223. The first lens 1121, the second lens 1122, the third lens 1123, the fourth lens 1124, the fifth lens 1221, the sixth lens 1222 and the seventh lens 1223 constitute an optical system with 7 pieces of lenses.

For example, in one embodiment, the first group unit 11 includes a first lens 1121, and the second group unit 12 includes 6 pieces of lenses, which are a second lens 1122, a third lens 1123, a fourth lens 1124, a fifth lens 1221, a sixth lens 1222 and a seventh lens 1223. The first lens 1121, the second lens 1122, the third lens 1123, the fourth lens 1124, the fifth lens 1221, the sixth lens 1222, and the seventh lens 1223 constitute an optical system with 7 pieces of lenses.

For example, in one embodiment, the first group unit 11 includes five pieces of lenses, which are a first lens 1121, a second lens 1122, a third lens 1123, a fourth lens 1124, and a fifth lens 1221, the second lens unit 12 includes two pieces of lenses, which are a sixth lens 1222 and a seventh lens 1223, respectively. The first lens 1121, the second lens 1122, the third lens 1123, the fourth lens 1124, the fifth lens 1221, the sixth lens 1222, and the seventh lens 1223 constitute an optical system with 7 pieces of lenses.

For example, in one embodiment, the first group unit 11 includes two pieces of lenses, which are a first lens 1121 and a second lens 1122, respectively, the second group unit 12 includes 5 pieces of lenses, which are a third lens 1123, a fourth lens 1124, a fifth lens 1221, a sixth lens 1222 and a seventh lens 1223, respectively. The first lens 1121, the second lens 1122, the third lens 1123, the fourth lens 1124, the fifth lens 1221, the sixth lens 1222, and the seventh lens 1223 constitute an optical system with 7 pieces of lenses.

In other embodiments of the present invention, the number of lenses of the first group unit 11 and the number of the second group unit 12 may also be a combination of other numbers, so as to form the multi-group lens assembly with different lens numbers, and it will be understood by those skilled in the art that the number of lenses of each group unit of the multi-group unit and the total number of lenses formed are not limitations of the present invention.

That is to say, the number of lenses of the first group unit 11 and the second group unit 12 of the multi-group lens assembly 10 with 7 pieces of lenses may be one of a combinations selected from: (4, 3), (3, 4), (6, 1), (1, 6), (5, 2), and (2, 5). Of course, when the total number of lenses of the multi-group lens assembly is other numbers, it may be a combination of the number of lenses in other group units.

Figure 22:
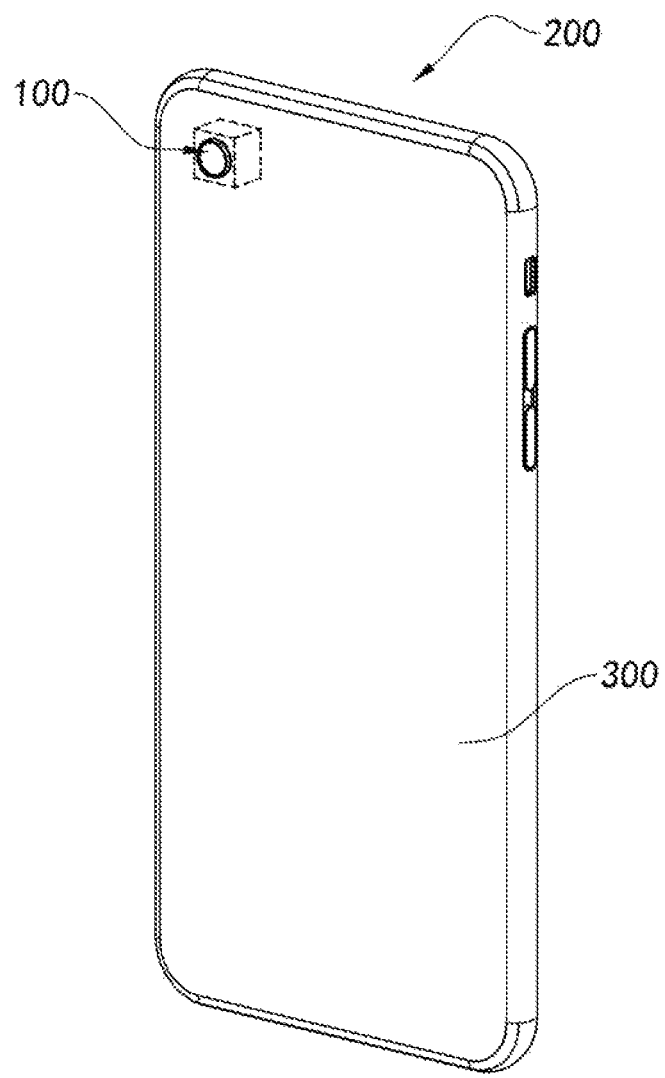
FIG. 22 is a schematic view of an application of a camera module constructed by the multi-group lens assembly according to the above embodiments of the present invention.

Referring to FIG. 22, the multi-group lens assembly 10 can be assembled and applied to different types of camera modules 100, and the camera module 100 can be applied to an electronic device 200, which is by way of example but not limited to a smart mobile phones, a wearable devices, a computer equipment, a television, a vehicle, a camera, surveillance device, etc. The electronic device 200 can include an electronic device main body 300. The camera module 100 is mounted in the electronic device main body 300, and cooperates with the electronic device body 300 to implement image collection and reproduction.

It should be understood by those skilled in the art that the embodiments of the present invention described in the above description and the accompanying drawings are only by way of illustration and not a limitation of the present invention. The object of the invention has been achieved completely and efficiently. The function and structural principle of the present invention have been shown and described in the embodiments, and the embodiments of the present invention may have any variation or modification without departing from the principle.

The invention claimed is:

1. A multi-group lens assembly, characterized by comprising:
   a first group unit including a first bearing component and at least one first group lenses which is mounted in the first bearing component;
   a second group unit including a second bearing component and at least one second group lens which is mounted in the second bearing component; and
   a first gap provided between the first group unit and the second group unit, wherein the first bearing component includes a first main body and an extension platform, and the extension platform forms the first gap with the second bearing component of the second group unit, and the second bearing component includes an inner convex wall, and the inner convex wall extends upwardly from the outside of a second main body of the second bearing component and forms an outer mounting groove.

2. The multi-group lens assembly according to claim 1, wherein the inner convex wall partially extends upwardly from an inner extension edge of the second bearing component to form the outer mounting groove that communicates with the outside, and an outer extension platform of the first group unit is accommodated in the outer mounting groove.

3. The multi-group lens assembly according to claim 2, wherein the inner convex wall is an annular wall, and the outer mounting groove is an annular groove.

4. The multi-group lens assembly according to claim 2, wherein an adjusting element is provided below the outer extension platform of the first bearing component of the first group unit and partially extends downwardly from the outer extension platform.

5. The multi-group lens assembly according to claim 4, wherein the adjusting element extends downwardly from an outer portion of the outer extension platform to form a second gap between the adjusting element and an outer wall of the first main body.

6. The multi-group lens assembly according to claim 5, wherein the outer extension platform and the first main body form a U-shaped structure, and the inner convex wall of the second bearing component of the second group unit is accommodated therein.

7. The multi-group lens assembly according to claim 6, wherein a third gap is formed between a lower portion of the first main body and the inner convex wall so as to adjust the assembling of the first group unit and the second group unit.

8. The multi-group lens assembly according to claim 1, wherein the inner convex wall is implemented as spaced convex structures.

9. The multi-group lens assembly according to claim 1, wherein the first main body has a first accommodating cavity, a first upper light passing hole and a first lower light passing hole, and the first group lens is accommodated in the first accommodating cavity, and light passes through the first upper light passing hole to arrive at the first group lens, and passes through the first lower light passing hole to arrive at the second group unit.

10. The multi-group lens assembly according to claim 1, wherein the second main body has a second accommodating cavity, a second upper light passing hole and a second lower light passing hole, and the second group of lenses is accommodated in the second accommodating cavity, and light passing through the first group unit passes through the second upper light passing hole to arrive at the second group of lenses in the second group unit, and passes out of the second group unit through the lower light passing hole.

11. The multi-group lens assembly according to claim 10, wherein the first main body below the extension platform extends into the second upper light passing hole of the second main body.

12. The multi-group lens assembly according to claim 10, wherein the second bearing component includes an inner extension edge, and the inner extension edge extends inwardly from the second main body to form the second upper light passing hole.

13. The multi-group lens assembly according to claim 1, wherein a connection medium is provided in the first gap, so as to fix the first group unit and the second group unit.

14. The multi-group lens assembly according to claim 13, wherein the connection medium is one or more selected from the group consisting of UV glue, thermosetting glue, UV thermosetting glue, and epoxy glue.

15. The multi-group lens assembly according to claim 1, wherein the number of lenses of the first group unit and the second group unit is a combination selected from (4, 3), (3, 4), (6, 1), (1, 6), (5, 2), and (2, 5).

16. The multi-group lens assembly according to claim 1, wherein the first group unit includes at least one first optical path element, which is arranged in cooperation with the lens to form a light path of the first group unit.

17. The multi-group lens assembly according to claim 1, wherein the second group unit includes a second optical path element, which is arranged in cooperation with the second group of lenses to form a light path of the second group unit.

18. The multi-group lens assembly according to claim 1, wherein the first group unit and the second group unit are assembled by active calibration.

19. A camera module, characterized by comprising:
the multi-group lens assembly according to claim 1; and
a photosensitive component, wherein the multi-group lens assembly is located in a photosensitive path of the photosensitive assembly.

20. An electronic device, characterized by comprising:
a device main body;
the multi-group lens assembly according to claim 1; and
a photosensitive component, the multi-group lens assembly is provided on the photosensitive path of the photosensitive component to form a camera module, and the camera module is provided on the device main body, and cooperates with the device main body to implement image collection and reproduction.

* * * * *